United States Patent
Yoo et al.

(10) Patent No.: US 11,853,119 B2
(45) Date of Patent: Dec. 26, 2023

(54) DISPLAY DEVICE AND ELECTRONIC DEVICE INCLUDING THE SAME

(71) Applicant: Samsung Display Co., Ltd., Yongin-si (KR)

(72) Inventors: Bugyoon Yoo, Hwaseong-si (KR); Yunjae Kim, Cheonan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/705,812

(22) Filed: Mar. 28, 2022

(65) Prior Publication Data
US 2022/0397935 A1 Dec. 15, 2022

(30) Foreign Application Priority Data
Jun. 14, 2021 (KR) .......................... 10-2021-0077030

(51) Int. Cl.
G06F 1/16 (2006.01)

(52) U.S. Cl.
CPC .......... G06F 1/1616 (2013.01); G06F 1/1643 (2013.01); G06F 1/1656 (2013.01); G06F 1/1686 (2013.01)

(58) Field of Classification Search
CPC .... G06F 1/1616; G06F 1/1643; G06F 1/1656; G06F 1/1652; G06F 3/041; G06F 2203/04102; G09F 9/301
See application file for complete search history.

(56) References Cited

U.S. PATENT DOCUMENTS

| 9,655,235 | B2 | 5/2017 | Hwang et al. |
| 10,976,873 | B2 | 4/2021 | Shin et al. |
| 11,152,580 | B2* | 10/2021 | Kawaguchi ........... G02F 1/1335 |
| 11,295,695 | B2 | 4/2022 | Zhang |
| 11,367,770 | B2 | 6/2022 | Park et al. |
| 2017/0352834 | A1* | 12/2017 | Kim ....................... H10K 50/844 |
| 2019/0132987 | A1* | 5/2019 | Koo ......................... H05K 7/18 |
| 2020/0107473 | A1* | 4/2020 | Tanabe ................... G06F 1/1626 |
| 2020/0183450 | A1* | 6/2020 | Jang ...................... H04M 1/0216 |

(Continued)

FOREIGN PATENT DOCUMENTS

| KR | 101958802 B1 | 3/2019 |
| KR | 1020200034946 A | 4/2020 |

(Continued)

Primary Examiner — James Wu
(74) Attorney, Agent, or Firm — CANTOR COLBURN LLP

(57) ABSTRACT

A display device includes a display panel including a first non-folding region, a second non-folding region, and a folding region between the first and second non-folding regions, and a lower member below the display panel. The lower member includes a support layer below the display panel and including a first support part which overlaps the first non-folding region, a second support part which overlaps the second non-folding region, and a folding part which overlaps the folding region, where openings are defined in the folding part, a digitizer below the support layer and corresponding to the first and support parts, a cover layer between the support layer and the digitizer and attached below the folding part, and a lower adhesion layer between the support layer and the digitizer. The lower adhesion layer is between the first and second support parts.

20 Claims, 17 Drawing Sheets

(56) References Cited

U.S. PATENT DOCUMENTS

| | | | |
|---|---|---|---|
| 2020/0411777 A1 | 12/2020 | Seo et al. | |
| 2021/0068276 A1 | 3/2021 | Kim et al. | |
| 2021/0157451 A1* | 5/2021 | Jeong | H10K 59/40 |
| 2021/0173437 A1 | 6/2021 | Bae et al. | |
| 2022/0129094 A1* | 4/2022 | Tatsuno | G06F 1/1616 |
| 2022/0283607 A1* | 9/2022 | Xu | G06F 1/1681 |
| 2022/0308624 A1* | 9/2022 | Gu | G06F 1/1616 |

FOREIGN PATENT DOCUMENTS

| | | |
|---|---|---|
| KR | 1020200084495 A | 7/2020 |
| KR | 1020200108754 A | 9/2020 |
| KR | 1020210000809 A | 1/2021 |
| KR | 1020210010717 A | 1/2021 |
| KR | 1020210028463 A | 3/2021 |

* cited by examiner

DISPLAY DEVICE AND ELECTRONIC DEVICE INCLUDING THE SAME

This application claims priority to Korean Patent Application No. 10-2021-0077030, filed on Jun. 14, 2021, and all the benefits accruing therefrom under 35 U.S.C § 119, the content of which in its entirety is herein incorporated by reference.

BACKGROUND

1. Field

Embodiments of the invention relate to a display device and an electronic device including the display device, and more particularly, to a display device having improving reliability and waterproof properties.

2. Description of the Related Art

An electronic device may include an active section that is activated with an electrical signal. The electronic device may use the active section to detect externally applied inputs and to display various images to provide users with information. With the development of variously shaped electronic devices, the active section may have various shapes.

SUMMARY

Embodiments of the invention provide a display device having improving reliability and waterproof properties and an electronic device including the display device.

According to an embodiment of the invention, a display device includes: a display panel which includes a first non-folding region, a second non-folding region, and a folding region between the first non-folding region and the second non-folding region; and a lower member below the display panel. In such an embodiment, the lower member includes: a support layer below the display panel, where the support layer includes a first support part which overlaps the first non-folding region, a second support part which overlaps the second non-folding region, and a folding part which overlaps the folding region, where a plurality of openings is defined in the folding part; a digitizer below the support layer, where the digitizer corresponds to the first support part and the second support part; a cover layer between the support layer and the digitizer, where the cover layer is attached below the folding part; and a lower adhesion layer between the support layer and the digitizer. In such an embodiment, the lower adhesion layer is below the first support part and the second support part.

In an embodiment, a thickness of the lower adhesion layer may be greater than a thickness of the cover layer.

In an embodiment, the thickness of the lower adhesion layer may be in a range of about 15 micrometers to about 25 micrometers. In such an embodiment, the thickness of the cover layer may be in a range of about 10 micrometers to about 20 micrometers.

In an embodiment, the cover layer may include at least one selected from thermoplastic polyurethane ("TPU"), rubber, and silicon.

In an embodiment, the first support part, the folding part, and the second support part may be sequentially arranged along a first direction. In such an embodiment, a first width in the first direction of the folding part may be less by a distance in a range of about 0.5 micrometers to about 3 micrometers than a second width in the first direction of the cover layer.

In an embodiment, the digitizer may include: a first digitizer having a first sensing area which corresponds to the first support part; and a second digitizer having a second sensing area which corresponds to the second support part. In such an embodiment, the second digitizer may be spaced apart from the first digitizer.

In an embodiment, the lower adhesion layer may include: a first lower adhesion layer in contact with a bottom surface of the first support part and with a top surface of the first digitizer; and a second lower adhesion layer in contact with a bottom surface of the second support part and with a top surface of the second digitizer.

In an embodiment, the digitizer may include: a base layer; and a plurality of coils on one surface of the base layer. In such an embodiment, the lower adhesion layer may cover an undulation on a top surface of the digitizer, where the undulation may be defined by the plurality of coils.

In an embodiment, the support layer may include a non-metallic material.

In an embodiment, the cover layer may be in contact with a bottom surface of the folding part and may be spaced apart from the digitizer.

In an embodiment, the lower member may further include: an electromagnetic shield layer below the digitizer; a lower metal plate below the electromagnetic shield layer; and a thermal radiation layer below the lower metal plate.

In an embodiment, the display device may further include: an input sensor directly on the display panel; and an antireflection layer directly on the input sensor.

In an embodiment, the antireflection layer may include: a plurality of color filters; and a partition layer between the plurality of color filters.

In an embodiment, the display panel may include: a display region which includes a first display region and a second display region adjacent to the first display region; and a peripheral region adjacent to the display region. In such an embodiment, the first display region may have an optical transmittance relatively greater than an optical transmittance of the second display region.

In an embodiment, the lower member may further include: a barrier layer below the display panel; a first adhesion part which attaches the barrier layer and the first support part to each other; and a second adhesion part which attaches the barrier layer and the second support part to each other. In such an embodiment, the second adhesion part may be spaced apart from the first adhesion part. In such an embodiment, an interval between the first adhesion part and the second adhesion part may be greater than an interval between the first support part and the second support part.

According to an embodiment of the invention, a display device includes: a display panel which includes a first non-folding region, a second non-folding region, and a folding region between the first non-folding region and the second non-folding region; and a lower member below the display panel. In such an embodiment, the lower member may include: a support layer below the display panel; a digitizer below the support layer; a lower adhesion layer in contact with a bottom surface of the support layer and with a top surface of the digitizer; and a cover layer in contact with the bottom surface of the support layer. In such an embodiment, the cover layer does not overlap the lower adhesion layer when viewed in a plan view.

In an embodiment, the digitizer may include: a base layer; and a plurality of coils on one surface of the base layer. In such an embodiment, the lower adhesion layer may cover an undulation on the top surface of the digitizer, where the undulation may be defined by the plurality of coils.

According to an embodiment of the invention, an electronic device includes: a display device which includes a signal transmission region through which an optical signal passes, a display region adjacent to the signal transmission region, and a non-display region adjacent to the display region, where the signal transmission region includes an element area which a light-emitting element overlaps and a transmission area which the light-emitting element does not overlap; and an electronic module below the display device, where the electronic module overlaps the signal transmission region. In such an embodiment, the display device includes: a display panel which includes a first non-folding region, a second non-folding region, and a folding region between the first non-folding region and the second non-folding region; and a lower member below the display panel. In such an embodiment, the lower member includes: a support layer below the display panel, the support layer including a first support part which overlaps the first non-folding region, a second support part which overlaps the second non-folding region, and a folding part which overlaps the folding region, where a plurality of openings is defined in the folding part; a digitizer below the support layer, where the digitizer corresponds to the first support part and the second support part; a cover layer between the support layer and the digitizer, where the cover layer is attached below the folding part; and a lower adhesion layer between the support layer and the digitizer. In such an embodiment, the lower adhesion layer is below the first support part and the second support part.

In an embodiment, the display device may further include a window. In such an embodiment, the window may include a base film and a bezel pattern which does not overlap the non-display region.

In an embodiment, the electronic module may include a camera module.

DETAILED DESCRIPTION

Figure 1A:
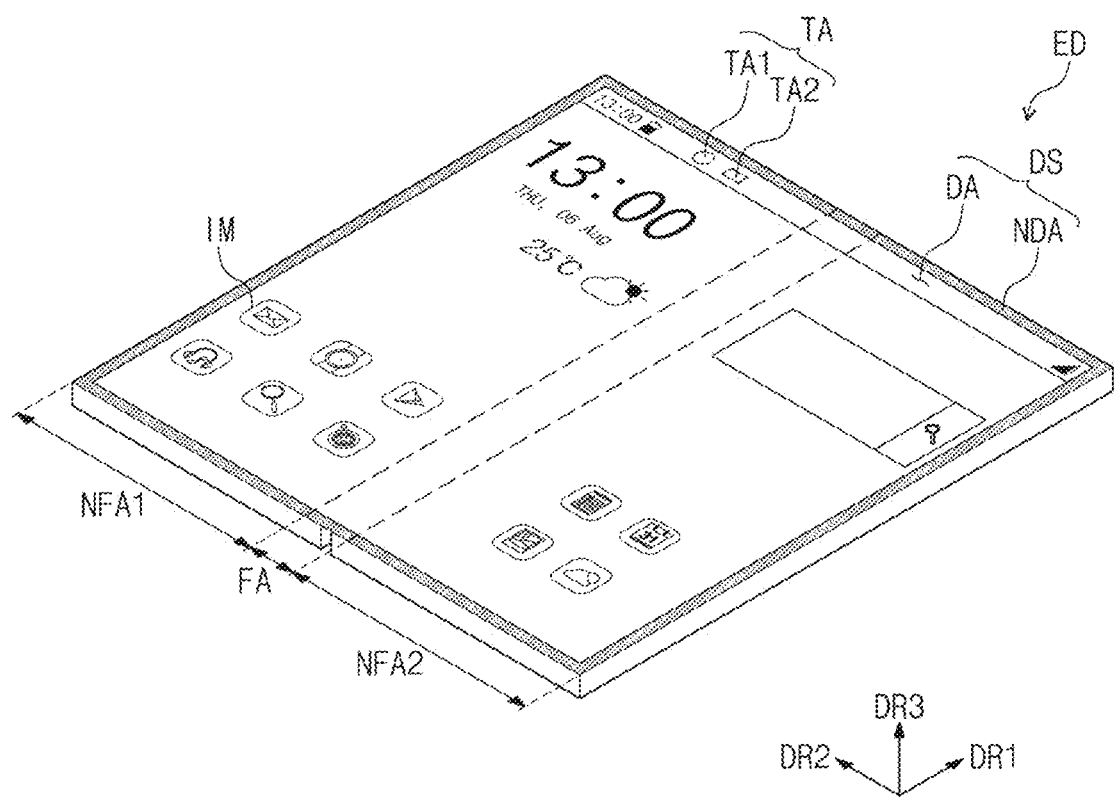
FIGS. 1A to 1C illustrate perspective views showing an electronic device according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In this disclosure, when a certain component (or region, layer, portion, etc.) is referred to as being "on", "connected to", or "coupled to" other component(s), the certain component may be directly disposed on, directly connected to, or directly coupled to the other component(s) or at least one intervening component may be present therebetween. In contrast, when an element is referred to as being "directly on" another element, there are no intervening elements present.

Like numerals indicate like components. Moreover, in the drawings, thicknesses, ratios, and dimensions of components are exaggerated for effectively explaining the technical contents.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms used herein including technical and scientific terms have the same meaning generally understood by one of ordinary skilled in the art. Also, terms as defined in dictionaries generally used should be understood as having meaning identical or meaning contextually defined in the art and should not be understood as ideally or excessively formal meaning unless definitely defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

Figure 1B:
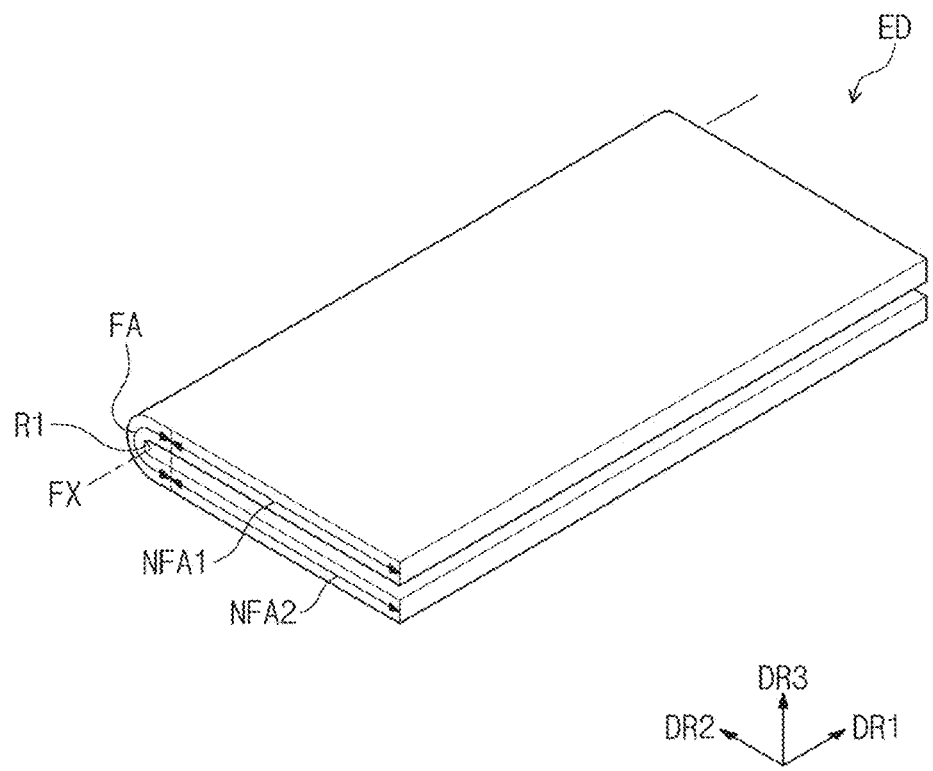
Figure 1C:
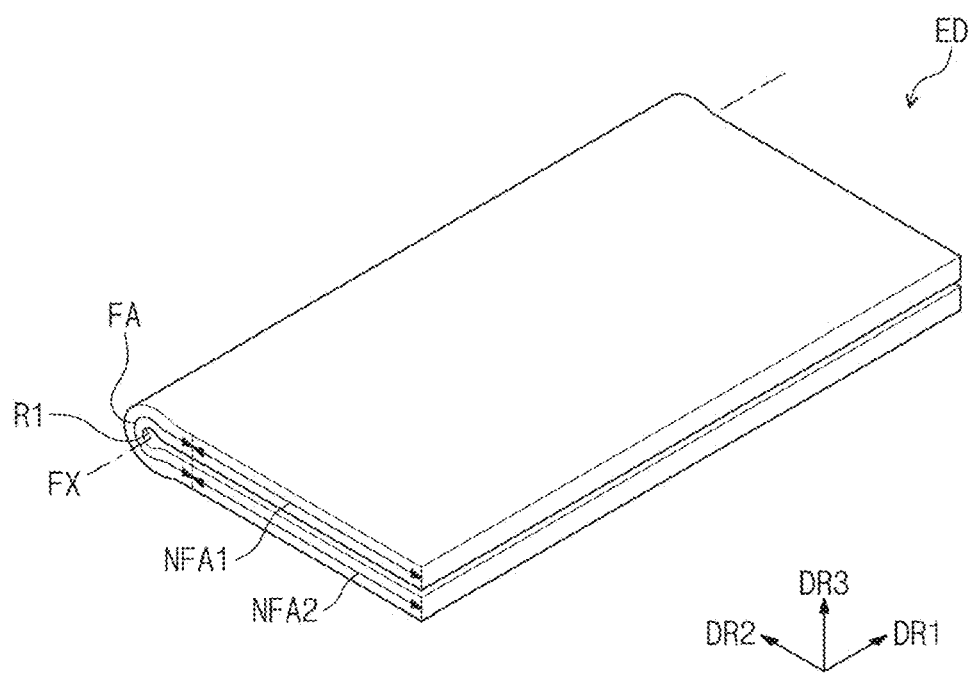

FIGS. 1A to 1C illustrate perspective views showing an electronic device ED according to an embodiment of the invention. FIG. 1A shows an embodiment of the electronic device ED in an unfolded state, and FIGS. 1B and 1C show an embodiment of the electronic device ED in a folded state.

Referring to FIGS. 1A to 1C, an embodiment of the electronic device ED may include a display surface DS defined by a first direction DR1 and a second direction DR2 that intersects the first direction DR1. The electronic device ED may use the display surface DS to provide users with an image IM.

In an embodiment, the display surface DS may include a display region DA and a non-display region NDA around the display region DA. The display region DA may display the image IM, and the non-display region NDA may not display the image IM. The non-display region NDA may surround the display region DA. The invention, however, is not limited thereto, and the display region DA and the non-display region NDA may be changed in shape.

The display surface DS may further include a signal transmission region TA. The signal transmission region TA may be a portion of the display region DA or a portion of the non-display region NDA. As illustrated in FIG. 1A, the signal transmission region TA may be a portion of the display region DA. The signal transmission region TA may have a transmittance greater than that of the display region DA and that of the non-display region NDA. Natural light, visible light, or infrared light may be emitted toward the signal transmission region TA. The electronic device ED may further include either a camera module that captures an external image by using the visible light that passes through the signal transmission region TA or a sensor module that uses the infrared light to determine access of external objects.

Differently from that shown in FIG. 1A, in an alternative embodiment of the invention, the signal transmission region TA may extend from the non-display region NDA without being spaced apart from the non-display region NDA. The signal transmission region TA may be provided in plural. In an embodiment, the signal transmission region TA may include a plurality of transmission regions TA1 and TA2, through which different types of light are transmitted, respectively.

A third direction DR3 is defined hereinafter as a direction that substantially vertically intersects a plane formed by the first and second directions DR1 and DR2. Herein, the phrase "when viewed in a plan view" may be defined to include the meaning of "when viewed in the third direction DR3."

In an embodiment, the electronic device ED may include a folding region FA and a plurality of non-folding regions NFA1 and NFA2. The non-folding regions NFA1 and NFA2 may include a first non-folding region NFA1 and a second non-folding region NFA2. When viewed in the third direction DR3, the first non-folding region NFA1 and the second non-folding region NFA2 are spaced apart from each other in the second direction DR2, and the folding region FA may be disposed between the first non-folding region NFA1 and the second non-folding region NFA2.

In an embodiment, as illustrated in FIG. 1B, the folding region FA may be foldable about a folding axis FX parallel to the first direction DR1. The folding region FA may have a certain curvature and a curvature radius R1. The first non-folding region NFA1 and the second non-folding region NFA2 may face each other, and the electronic device ED may be in an inner-folding state such that the display surface DS may not be externally exposed.

In an embodiment of the invention, the electronic device ED may be in an outer-folding state such that the display surface DS may be externally exposed. In an embodiment of the invention, the electronic device ED may be configured to reciprocally repeat the inner-folding and/or outer-folding state from an unfolding state. In an embodiment of the invention, the electronic device ED may be configured to perform one of a folding operation, an inner-folding operation, and an outer-folding operation.

In an embodiment, as illustrated in FIG. 1B, a distance between the first non-folding region NFA1 and the second non-folding region NFA2 may be substantially the same as the curvature radius R1, but not being limited thereto. Alternatively, as shown in FIG. 1C, the distance between the first non-folding region NFA1 and the second non-folding region NFA2 may be less than the curvature radius R1.

FIGS. 1B and 1C show an embodiment of the electronic device ED where a casing (see EDC of FIG. 2) is omitted for convenience of illustration. In such an embodiment, the casing EDC that constitutes an appearance of the electronic device ED may be in contact with each other at ends of the first and second non-folding regions NFA1 and NFA2 in a folded state.

FIGS. 1A to 1C show an embodiment of the electronic device ED including a single folding region FA arranged between two non-folding regions NFA1 and NFA2, but not being limited thereto. Alternatively, the electronic device ED may include a plurality of folding regions to have a structure capable of being folded several times.

Figure 2:
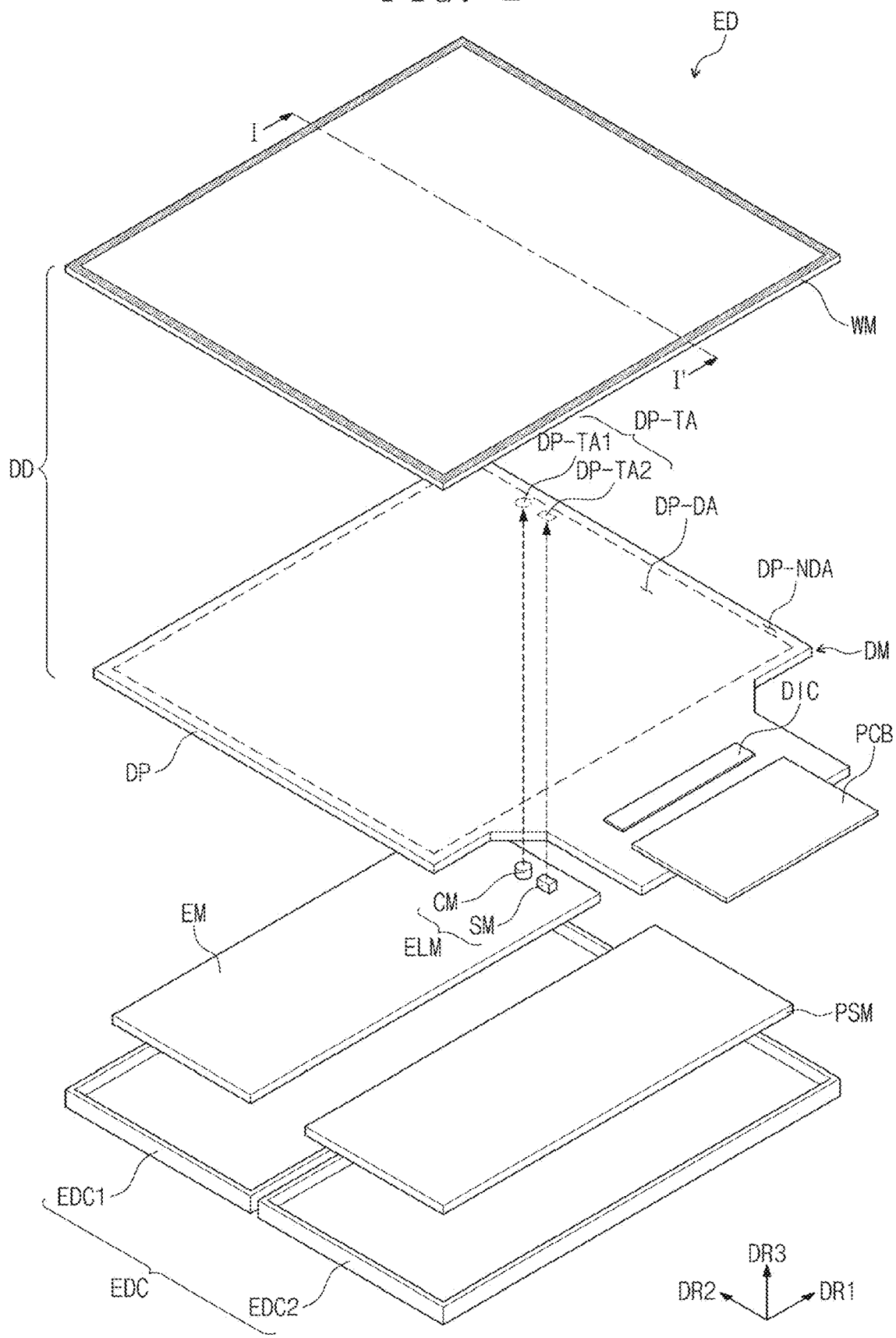
FIG. 2 illustrates an exploded perspective view showing an electronic device according to an embodiment of the invention.
Figure 3:
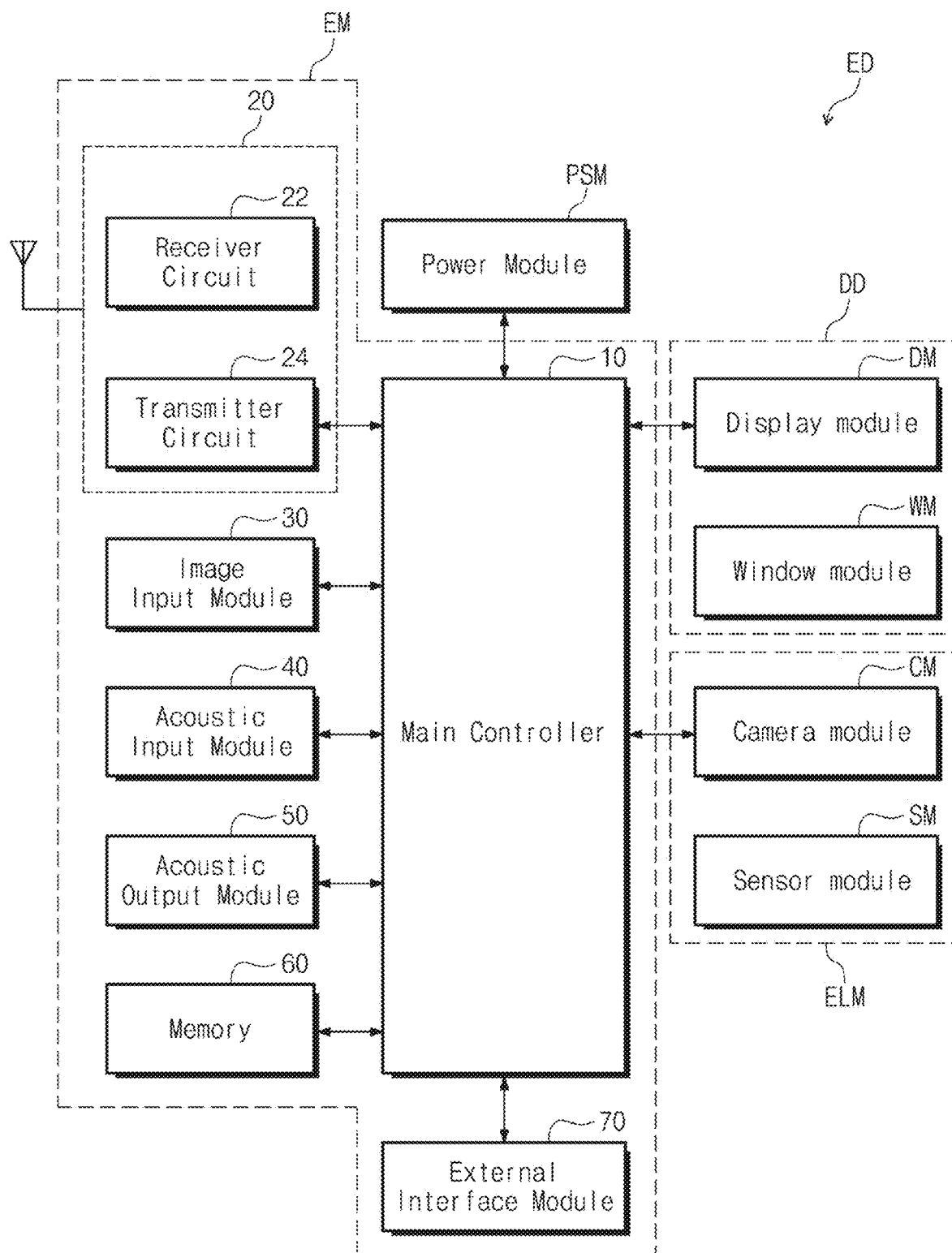
FIG. 3 illustrates a block diagram showing an electronic device according to an embodiment of the invention.
Figure 4:
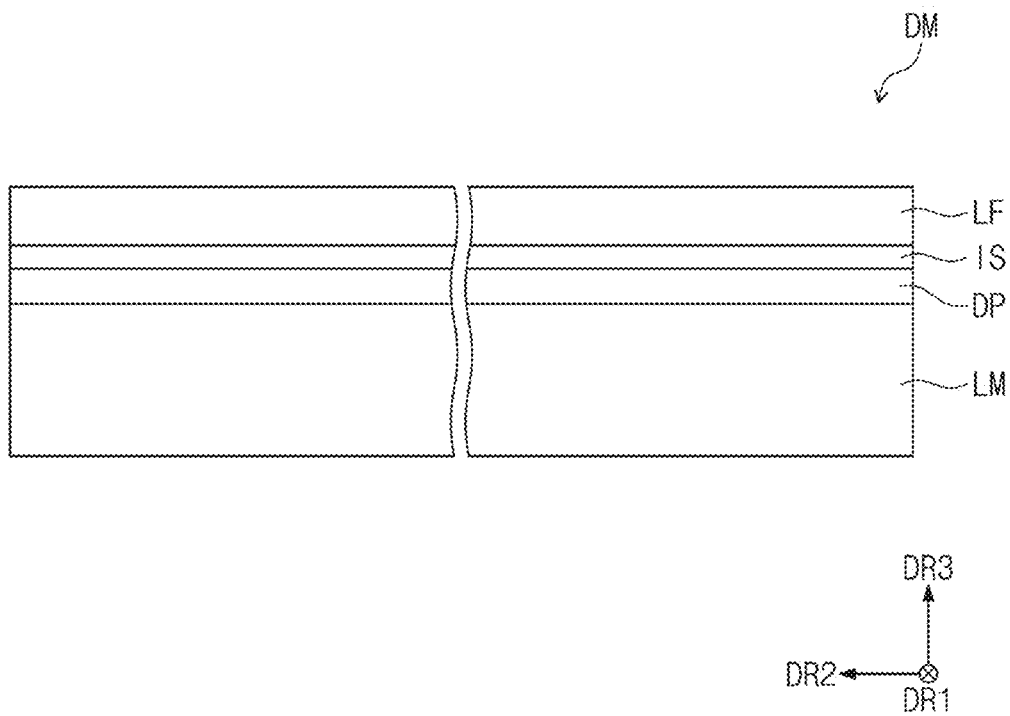
FIG. 4 illustrates a cross-sectional view showing a display module according to an embodiment of the invention.

FIG. 2 illustrates an exploded perspective view showing the electronic device ED according to an embodiment of the invention. FIG. 3 illustrates a block diagram showing the electronic device ED according to an embodiment of the invention. FIG. 4 illustrates a cross-sectional view showing a display module DM according to an embodiment of the invention. FIG. 4 shows a cross-section that corresponds to that taken along line I-I' of FIG. 2.

In an embodiment, as shown in FIG. 2, the electronic device ED may include a display device DD, a control module EM, a power module PSM, an electronic module ELM, and a casing EDC. Although not shown separately, the power module PSM may include a mechanism structure that controls a folding operation of the display device DD.

In an embodiment, the display device DD generates an image and detects an external input. The display device DD includes a window module WM and a display module DM. The window module WM provides or defines a front surface of the electronic device ED.

The display module DM may include a display panel DP. FIG. 2 shows only the display panel DP in a stack structure of the display module DM, for convenience of illustration, but not being limited thereto. In such an embodiment, the display module DM may further include a plurality of components located above and below the display panel DP. The stack structure of the display module DM will hereinafter be discussed in detail.

The display panel DP includes a display region DP-DA and a non-display region DP-NDA that respectively correspond to the display region (see DA of FIG. 1A) and the non-display region (see NDA of FIG. 1A) of the electronic device ED. Herein, the phrase "a region/part corresponds to a region/part" may mean "a region/part overlaps a region/part", which interpretation is not limited to the meaning of "a region/part has the same area as that of a region/part." The display module DM may include a driver chip DIC disposed on the non-display region DP-NDA. The display module DM may further include a printed circuit board ("PCB") combined with the non-display region DP-NDA.

The display panel DP may further include a signal transmission region DP-TA. The signal transmission region DP-TA may be an aperture or a zone (or area) whose resolution is less than that of the display region DP-DA. Therefore, the signal transmission region DP-TA has a transmittance greater than that of the display region DP-DA and that of the non-display region DP-NDA. The signal transmission region DP-TA of the display panel DP may be a zone that corresponds to the signal transmission region TA of the electronic device ED described above. The signal transmission region DP-TA may include a first signal transmission region DP-TA1 that corresponds to a camera module CM which will be discussed below and a second signal transmission region DP-TA2 that corresponds to a sensor module SM which will be discussed below.

The driver chip DIC may include driving elements, such as data driver circuit, for driving pixels of the display panel DP. FIG. 2 shows an embodiment having a structure in which the driver chip DIC is mounted on the display panel DP, but the invention is not limited thereto. In an embodiment, for example, the driver chip DIC may be mounted on a printed circuit board PCB.

The control module EM includes at least a main controller 10. In an embodiment, the control module EM may include the main controller 10, a wireless communications module 20, an image input module 30, an acoustic input module 40, an acoustic output module 50, a memory 60, and an external interface module 70. The modules may be mounted on the printed circuit board PCB or may be electrically connected through a flexible circuit board to the printed circuit board PCB. The control module EM may be electrically connected to the power module PSM.

The main controller 10 controls overall operation of the electronic device ED. In an embodiment, for example, the main controller 10 activates or deactivates the display device DD in response to user's inputs. In such an embodiment, the main controller 10 may control the image input module 30, the acoustic input module 40, and the acoustic output module 50 based on user's inputs. The main controller 10 may include at least one microprocessor.

The wireless communications module 20 may use Bluetooth® or WiFi® communications to transceive wireless signals with other terminals. The wireless communications module 20 may use a conventional communications system to transceive speech signals. The wireless communications module 20 includes a transmitter circuit 22 that modulates and transmits signals, and also includes a receiver circuit 24 that demodulates received signals.

The image input module 30 processes and converts image signals into image data capable of being displayed on the display device DD. In a record module or a speech mode, the acoustic input module 40 receives external sound signals through a microphone and converts the received sound signals into electrical voice data. The acoustic output module 50 converts and outputs sound data that is received from the wireless communications module 20 or is stored in the memory 60.

The external interface module 70 serves as an interface connected to an external charger, a wire/wireless data port, a card socket (e.g., memory card, SIM/UIM card).

The power module PSM supplies power used for overall operation of the electronic device ED. The power module PSM may include a battery module, for example.

The casing EDC accommodates the display module DM, the control module EM, the power module PSM, and the electronic module ELM. In an embodiment, as shown in FIG. 2, the casing EDC may include two casings EDC1 and EDC2 that are separated from each other, but the invention is not limited thereto. Although not shown, the electronic device ED may further include a hinge structure that connects the two casings EDC1 and EDC2 to each other. The casing EDC may be combined with the window module WM. The casing EDC protects the display module DM, the control module EM, the power module PSM, and the electronic module ELM that are accommodated in the casing EDC.

The electronic module ELM may be an electric component that outputs or receives optical signals. The electronic module ELM transmits optical signals through a partial region of the electronic device ED, which partial region corresponds to the signal transmission region (see TA of FIG. 1A). In an embodiment, the electronic module ELM may include a camera module CM. The camera module CM may capture external images from natural light signals received through the first signal transmission region DP-TA'. The electronic module ELM may include a sensor module SM, such as a proximity sensor or an ultraviolet light-emitting sensor. The sensor module SM may recognize a user's body part (e.g., fingerprint, iris, or face) through the second signal transmission region DP-TA2 or may measure a distance between an object and a mobile phone through the second signal transmission region DP-TA2.

The electronic module ELM is disposed below the display device DD. The electronic module ELM is disposed to correspond to the signal transmission region (see TA of FIG. 1A) of the electronic device ED. In an embodiment, for example, the electronic module ELM overlaps the signal transmission region DP-TA of the display panel DP. The signal transmission region DP-TA of the display panel DP may be a zone whose optical transmittance is greater than those of other zones of the display panel DP.

Referring to FIG. 4, the display module DM may include the display panel DP, an input sensor IS disposed on the display panel DP, an antireflection layer LF disposed on the input sensor IS, and a lower member LM disposed below the display panel DP. Alternatively, one or more adhesion layers may be selectively provided or disposed between the components mentioned above.

The display panel DP may include a base layer, a circuit element layer disposed on the base layer, a display element layer disposed on the circuit element layer, and a thin-film encapsulation layer disposed on the display element layer. The base layer may include a plastic film. In an embodiment, for example, the base layer may include polyimide. In an embodiment, the base layer may have a planar shape the same as that of the display panel DP shown in FIG. 6A which will be discussed below.

The circuit element layer may include an organic layer, an inorganic layer, a semiconductor pattern, a conductive pattern, and a signal line. In an embodiment, a coating process and/or a deposition process may be employed to form the organic layer, the inorganic layer, the semiconductor layer, and the conductive layer on the base layer. In such an embodiment, a photolithography process may be performed several times after the coating process and/or the deposition process such that the organic layer, the inorganic layer, the semiconductor layer, and the conductive layer may be selectively patterned to form the semiconductor pattern, the conductive pattern, and the signal line.

The semiconductor pattern, the conductive pattern, and the signal line may form or define signal lines SL1-SLm, DL1-DLn, EL1-ELm, CSL1, CSL2, and PL and a pixel driver circuit of pixels PX shown in FIG. 6A which will be discussed below. The pixel driver circuit may include at least one transistor.

Figure 6A:
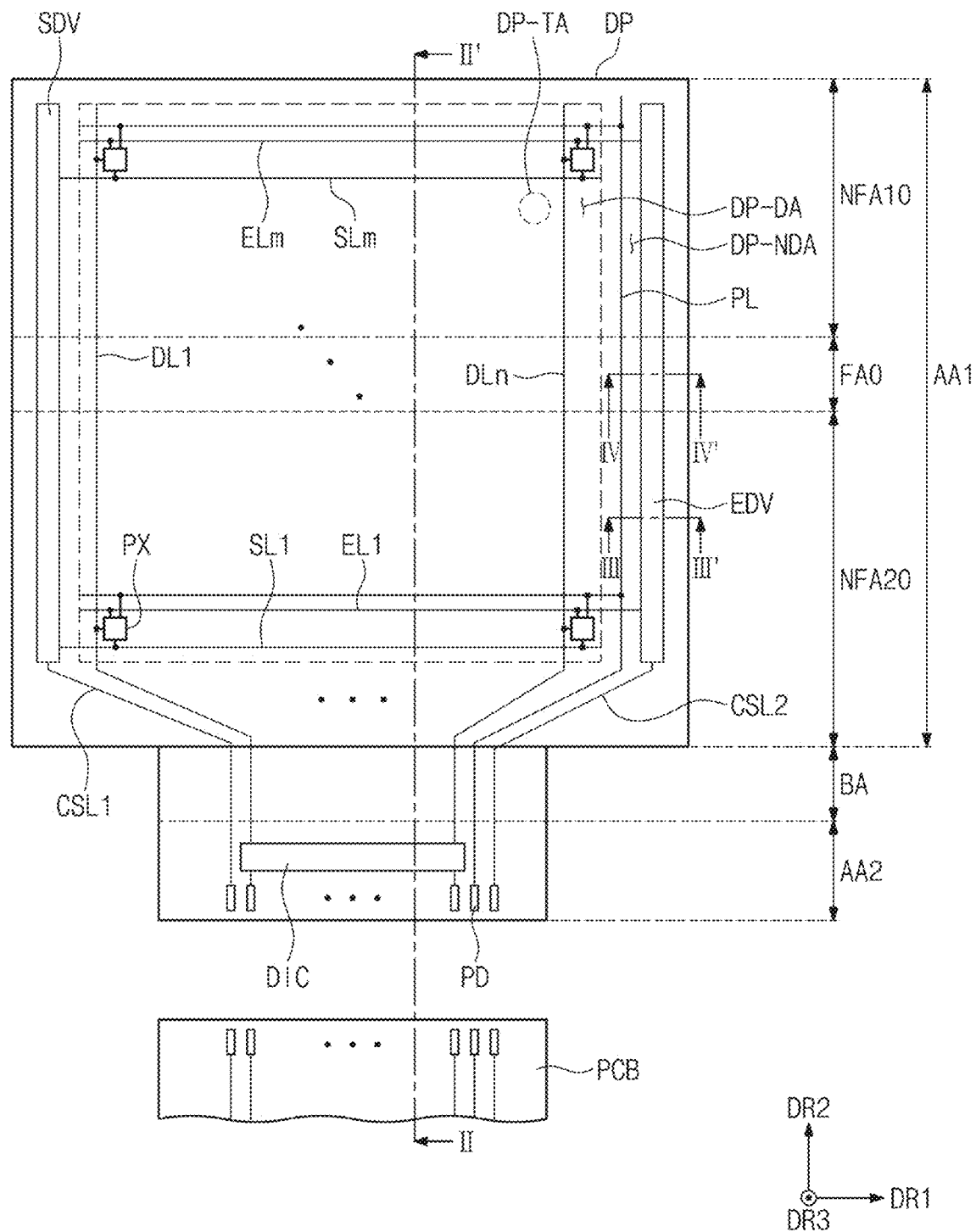
FIG. 6A illustrates a plan view showing a display panel according to an embodiment of the invention.

The display element layer includes light-emitting elements of pixels PX shown in FIG. 6A. The light-emitting element is electrically connected to the at least one transistor. The thin-film encapsulation layer may be disposed on and encapsulate the circuit element layer. The thin-film encapsulation layer may include an inorganic layer, an organic layer, and an inorganic layer that are sequentially stacked. However, the stack structure of the thin-film encapsulation layer is not particularly limited.

The input sensor IS may include a plurality of sensing electrodes (not shown) that detect external inputs, a plurality of trace lines (not shown) connected to the plurality of sensing electrodes, and one or more of inorganic and organic layers that insulate and/or protect the plurality of sensing electrodes or the plurality of trace lines. The input sensor IS may be a capacitive sensor, but the invention is not particularly limited thereto.

When the display panel DP is fabricated, a series of processes may be employed to directly form the input sensor IS on the thin-film encapsulation layer. The invention, however, is not limited thereto, and alternatively, the input sensor IS may be separately fabricated in the form of a panel and may then be attached through an adhesion layer to the display panel DP.

The antireflection layer LF may reduce a reflectance of external light. The antireflection layer LF may include one or more of a retarder and a polarizer. The antireflection layer LF may include at least a polarizing film. Alternatively, the antireflection layer LF may include color filters. The color filters may be arranged in a certain manner. The arrangement of the color filters may be determined based on colors of light emitted from pixels included in the display panel DP. The antireflection layer LF may further include a partition layer adjacent to the color filters.

The lower member LM may include various functional members. In an embodiment, for example, the lower member LM may include a light-shield layer that blocks incident light, an impact-absorbing layer that absorbs external impact, a support layer that supports the display panel DP, and a thermal radiation layer that discharges heat generated from the display panel DP. However, the stack structure of the lower member LM is not particularly limited.

Figure 5:
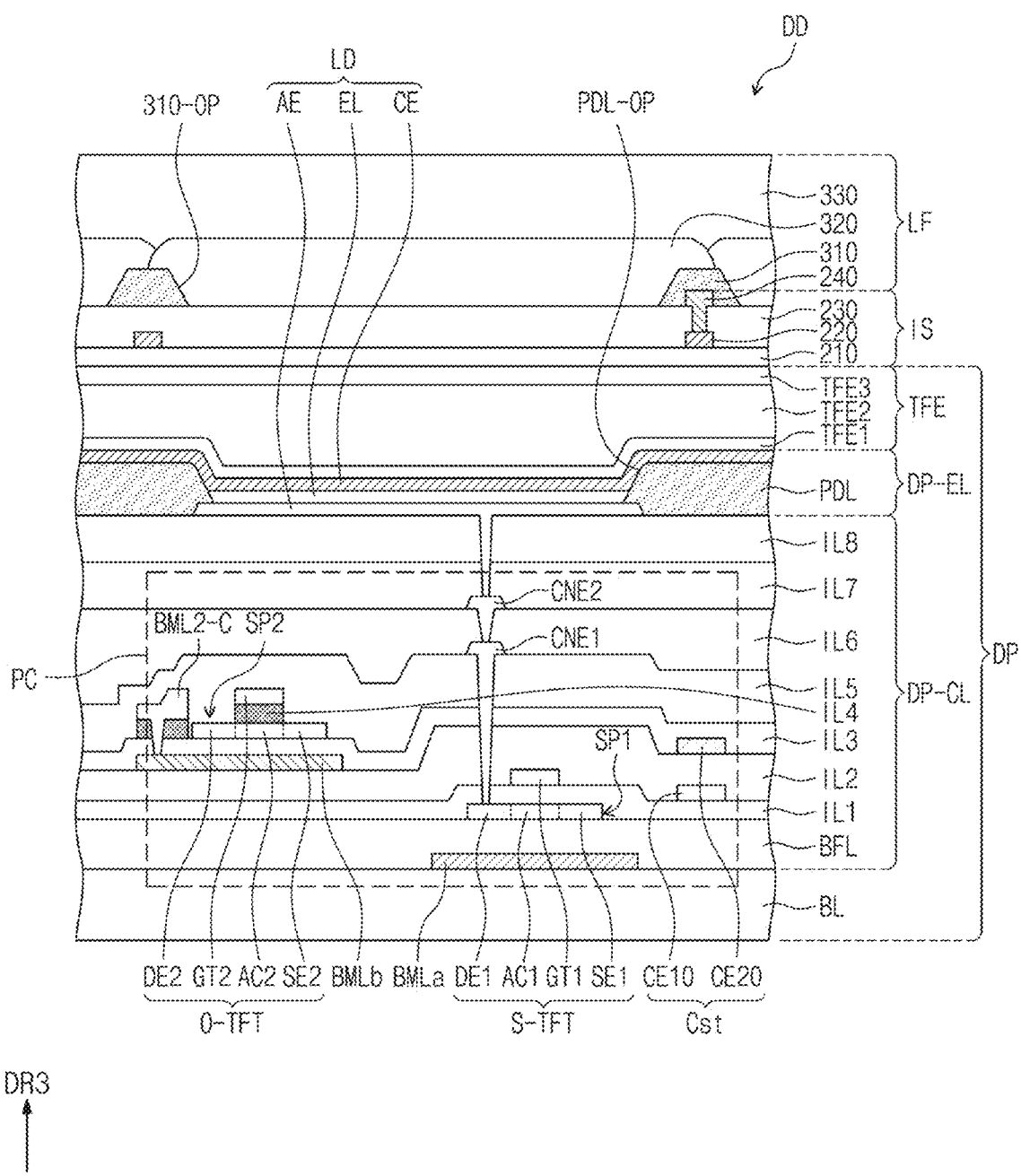
FIG. 5 illustrates a cross-sectional view partially showing a display module according to an embodiment of the invention.

FIG. 5 illustrates a cross-sectional view partially showing the display module DM according to an embodiment of the invention. FIG. 5 shows in detail the display panel DP, the input sensor IS, and the antireflection layer LF of the display module DM shown in FIG. 4, which components DP, IS, and LF are arranged to correspond to a single pixel.

FIG. 5 shows a single light-emitting element LD, and also shows a silicon transistor S-TFT and an oxide transistor O-TFT that are included in a pixel circuit PC. The oxide transistor O-TFT may be one of a plurality of transistors included in the pixel circuit PC, and the silicon transistor S-TFT may another one of a plurality of transistors included in the pixel circuit PC.

A buffer layer BFL may be disposed on a base layer BL. The buffer layer BFL may prevent metal elements or impurities from diffusing from the base layer BL toward a first semiconductor pattern SP1 on the buffer layer BFL. The first semiconductor pattern SP1 includes an active section AC1 of the silicon transistor S-TFT. The buffer layer BFL may control the rate of introduction of heat during a crystallization process for the formation of the first semiconductor pattern SP1.

A first backside metal layer BMLa may be disposed below the silicon transistor S-TFT, and a second backside metal layer BMLb may be disposed below the oxide transistor O-TFT. The first and second backside metal layers BMLa and BMLb may be located overlapping the pixel circuit PC. The first and second backside metal layers BMLa and BMLb may block external light from reaching the pixel circuit PC.

The first backside metal layer BMLa may be disposed to correspond to at least a partial area of the pixel circuit PC. The first backside metal layer BMLa may be disposed to overlap a driver transistor defined by the silicon transistor S-TFT.

The first backside metal layer BMLa may be disposed between the base layer BL and the buffer layer BFL. In an embodiment of the invention, an inorganic barrier layer may further be disposed between the first backside metal layer BMLa and the buffer layer BFL. The first backside metal layer BMLa may be connected to an electrode or a wiring line, and may receive a constant voltage or a signal from the electrode or the wiring line. According to an embodiment of the invention, the first backside metal layer BMLa may be a floating electrode that is isolated from other electrodes or wiring lines.

The second backside metal layer BMLb may be disposed below the oxide transistor O-TFT. The second backside metal layer BMLb may be placed between a second dielectric layer IL2 and a third dielectric layer IL3. The second backside metal layer BMLb may be located at a same level (or disposed in a same layer) as that of a second electrode CE20 of a storage capacitor Cst. The second backside metal layer BMLb may be connected to a contact electrode BML2-C, and may receive a constant voltage or a signal from the contact electrode BML2-C. The contact electrode BML2-C may be located at a same level (or disposed in a same layer) as that of a gate GT2 of the oxide transistor O-TFT.

Each of the first and second backside metal layers BMLa and BMLb may include reflective metal. In an embodiment, for example, each of the first and second backside metal layers BMLa and BMLb may include silver (Ag), an alloy containing silver (Ag), molybdenum (Mo), an alloy containing molybdenum (Mo), aluminum (Al), an alloy containing aluminum (Al), aluminum nitride (AlN), tungsten (W), tungsten nitride (WN), copper (Cu), or p+ doped amorphous silicon. The first and second backside metal layers BMLa and BMLb may include a same material as each other or different materials from each other.

Although not shown separately, according to an embodiment of the invention, the second backside metal layer BMLb may be omitted. The first backside metal layer BMLa may extend to a zone below the oxide transistor O-TFT, and may thus block incidence of light on the zone below the oxide transistor O-TFT.

The first semiconductor pattern SP1 may be disposed on the buffer layer BFL. The first semiconductor pattern SP1 may include a silicon semiconductor. The silicon semiconductor may include, for example, amorphous silicon or polycrystalline silicon. In an embodiment, for example, the first semiconductor pattern SP1 may include low-temperature polysilicon.

FIG. 5 shows only the first semiconductor pattern SP1 located on the buffer layer BFL for convenience of illustration, but the first semiconductor pattern SP1 may further be placed on other regions. The first semiconductor pattern SP1 may be arranged over pixels. The first semiconductor pattern SP1 may have electrical properties that are changed based on whether the first semiconductor pattern SP1 is doped or not. The first semiconductor pattern SP1 may include a first region whose conductivity is high and a second region whose conductivity is low. The first region may be doped with n-type or p-type impurities. A p-type transistor may include a doped region implanted with p-type impurities, and an n-type transistor may include a doped region implanted with n-type impurities. The second region may be an undoped region or may be a doped region implanted with impurities whose concentration is lower than that of impurities doped in the first region.

The first region may have conductivity greater than that of the second region, and may substantially serve as an electrode or a signal line. The second region may substantially correspond to an active section (or channel) of a transistor. In an embodiment, for example, a portion of the first semiconductor pattern SP1 may be an active section of a transistor, another portion of the first semiconductor pattern SP1 may be a source or drain of the transistor, and still another portion of the first semiconductor pattern SP1 may be a connection electrode or a connection signal line.

The silicon transistor S-TFT may include a source section SE1 (or source), an active section AC1 (or channel), and a drain section DE1 (or drain), all of which are formed from the first semiconductor pattern SP1. When viewed in cross-section, the source section SE1 and the drain section DE1 may extend in opposite directions from the active section AC1.

A first dielectric layer IL1 may be disposed on the buffer layer BFL. The first dielectric layer IL1 may commonly overlap a plurality of pixels and may cover the first semiconductor pattern SP1. The first dielectric layer IL1 may be an inorganic layer and/or an organic layer, and may have a single-layered or multi-layered structure. The first dielectric layer IL1 may include at least one selected from aluminum oxide, titanium oxide, silicon oxide, silicon nitride, silicon oxynitride, zirconium oxide, and hafnium oxide. In an embodiment, the first dielectric layer IL1 may be a single-layered silicon oxide layer. Likewise the first dielectric layer ILL a dielectric layer of a circuit layer DP-CL which will be discussed below may be an inorganic layer and/or an organic layer, and may have a single-layered or multi-layered structure. The inorganic layer may include at least one of the materials mentioned above, but the invention is not limited thereto.

A gate GT1 of the silicon transistor S-TFT is disposed on the first dielectric layer IL1. The gate GT1 may be a portion of a metal pattern. The gate GT1 overlaps the active section AC1. The gate GT1 may serve as a mask used in a process where the first semiconductor pattern SP1 is doped. The gate GT1 may include titanium (Ti), silver (Ag), an alloy containing silver (Si), molybdenum (Mo), an alloy containing molybdenum (Mo), aluminum (Al), an alloy containing aluminum (Al), aluminum nitride (AlN), tungsten (W), tungsten nitride (WN), copper (Cu), indium tin oxide ("ITO"), or indium zinc oxide ("IZO"), but the invention is not particularly limited thereto.

The second dielectric layer IL2 may be disposed on the first dielectric layer IL', and may cover the gate GT1 of the silicon transistor S-TFT. The third dielectric layer IL3 may be disposed on the second dielectric layer IL2. In an embodiment, the second electrode CE20 of the storage capacitor Cst may be disposed between the second dielectric layer IL2 and the third dielectric layer IL3. In such an embodiment, a first electrode CE10 of the storage capacitor Cst may be disposed between the first dielectric layer IL1 and the second dielectric layer IL2.

A second semiconductor pattern SP2 may be disposed on the third dielectric layer IL3. The second semiconductor pattern SP2 may include an active section AC2 of the oxide transistor O-TFT which will be discussed below. The second semiconductor pattern SP2 may include an oxide semiconductor. The second semiconductor pattern SP2 may include transparent conductive oxide ("TCO"), such as ITO, IZO, indium gallium zinc oxide ("IGZO"), zinc oxide (ZnO), or indium oxide ($In_2O_3$).

An oxide semiconductor may include a plurality of regions that are divided based on whether transparent conductive oxide is reduced or not. An area (or reducing area) where transparent conductive oxide is reduced has conductivity greater than that of an area (or non-reducing area) where transparent conductive oxide is not reduced. The reducing area substantially has a role as or defines a signal line or a source/drain of a transistor. The non-reducing area substantially corresponds to a semiconductor section (or active section or channel) of a transistor. In such an embodiment, a portion of the second semiconductor pattern SP2 may be a semiconductor section of a transistor, another portion of the second semiconductor pattern SP2 may be a source/drain section of the transistor, and still another portion of the second semiconductor pattern SP2 may be a signal transfer section.

The oxide transistor O-TFT may include a source section SE2 (or source), an active section AC2 (or channel), and a drain section DE2 (or drain), all of which are formed from the second semiconductor pattern SP2. When viewed in cross-section, the source section SE2 and the drain section DE2 may extend in opposite directions from the active section AC2.

A fourth dielectric layer IL4 may be disposed on the third dielectric layer IL3. In an embodiment, as illustrated in FIG. 5, the fourth dielectric layer IL4 may be a dielectric pattern that overlaps the gate GT2 of the oxide transistor O-TFT and exposes the source and drain sections SE2 and DE2 of the oxide transistor O-TFT. The fourth dielectric layer IL4 may cover the second semiconductor pattern SP2.

In an embodiment, as illustrated in FIG. 5, the gate GT2 of the oxide transistor O-TFT is disposed on the fourth dielectric layer IL4. The gate GT2 of the oxide transistor O-TFT may be a portion of a metal pattern. The gate GT2 of the oxide transistor O-TFT overlaps the active section AC2 of the oxide transistor O-TFT.

A fifth dielectric layer IL5 may be disposed on the fourth dielectric layer IL4, and may cover the gate GT2 of the oxide transistor O-TFT. A first connection electrode CNE1 may be disposed on the fifth dielectric layer IL5. The first connection electrode CNE1 may be coupled to the drain section DE1 of the silicon transistor S-TFT through a contact hole that penetrates the first, second, third, fourth, and fifth dielectric layers Il1, IL2, IL3, IL4, and IL5.

A sixth dielectric layer IL6 may be disposed on the fifth dielectric layer IL5. A second connection electrode CNE2 may be disposed on the sixth dielectric layer IL6. The second connection electrode CNE2 may be coupled to the first connection electrode CNE1 through a contact hole that penetrates the sixth dielectric layer IL6. A seventh dielectric layer IL7 may be disposed on the sixth dielectric layer IL6, and may cover the second connection electrode CNE2. An eighth dielectric layer IL8 may be disposed on the seventh dielectric layer IL7.

Each of the sixth, seventh, and eighth dielectric layers IL6, IL7, and IL8 may be an organic layer. In an embodiment, for example, each of the sixth, seventh, and eighth dielectric layers IL6, IL7, and IL8 may include a general universal polymer such as benzocyclobutene ("BCP"), polyimide, hexamethyldisiloxane ("HMDSO"), polymethylmethacrylate ("PMMA"), and polystyrene ("PS"), a polymer derivative having a phenol group, an acryl-based polymer, an imide-based polymer, an aryl ether-based polymer, an amide-based polymer, a fluoride-based polymer, a p-xylene-based polymer, a vinyl alcohol-based polymer, or a combination (e.g., a blend) thereof.

The light-emitting element LD may include a first electrode AE, an emission layer EL, and a second electrode CE. The second electrode CE may be provided in common on a plurality of light-emitting elements.

The first electrode AE of the light-emitting element LD may be disposed on the eighth dielectric layer IL8. The first electrode AE of the light-emitting element LD may be a transmissive electrode, a transflective electrode, or a reflective electrode. According to an embodiment of the invention, the first electrode AE of the light-emitting element LD may include a reflective layer that includes or is formed of Ag, Mg, Al, Pt, Pd, Au, Ni, Nd, Ir, Cr, or any compound thereof and a transparent or transflective electrode layer that is disposed on the reflective layer. The transparent or transflective electrode layer may include or be formed of at least one selected from ITO, IZO, IGZO, zinc oxide (ZnO), indium oxide ($In_2O_3$), and aluminum-doped zinc oxide ("AZO"). In an embodiment, for example, the first electrode AE of the light-emitting element LD may include a stack structure of ITO/Ag/ITO.

A pixel definition layer PDL may be disposed on the eighth dielectric layer IL8. The pixel definition layer PDL may exhibit light-absorbing properties and may have, for example, a black color. The pixel definition layer PDL may include a black coloring agent. The black coloring agent may include a black dye or a black pigment. The black coloring agent may include one of carbon blacks, metals such as chromium, and oxides thereof. The pixel definition layer PDL may correspond to a light-shield pattern having light-shield properties.

The pixel definition layer PDL may cover a portion of the first electrode AE of the light-emitting element LD. In an embodiment, for example, the pixel definition layer PDL may have an opening PDL-OP that exposes a portion of the first electrode AE of the light-emitting element LD. The pixel definition layer PDL may increase a distance between the second electrode CE and an edge of the first electrode AE of the light-emitting element LD. Therefore, the pixel definition layer PDL may serve to prevent the occurrence of arc at the edge of the first electrode AE.

Although not shown, a hole control layer may be disposed between the first electrode AE and the emission layer EL. The hole control layer may include a hole transport layer and may further include a hole injection layer. An electrode control layer may be disposed between the emission layer EL and the second electrode CE. The electrode control layer may include an electrode transport layer and may further include an electrode injection layer. An open mask may be used such that the hole control layer and the electron control layer may be formed in common on a plurality of pixels (see PX of FIG. 6A).

An encapsulation layer TFE may be disposed on a light-emitting element layer DP-EL. The encapsulation layer TFE may include an inorganic layer TFE1, an organic layer TFE2, and an inorganic layer TFE3 that are sequentially stacked, but no limitation is imposed on layers included in the encapsulation layer TFE.

The inorganic layers TFE1 and TFE3 may protect the light-emitting element layer DP-EL against moisture and/or oxygen, and the organic layer TFE2 may protect the light-emitting element layer DP-EL against foreign substances such as dust particles. The inorganic layers TFE1 and TFE3 may include a silicon nitride layer, a silicon oxynitride layer, a silicon oxide layer, a titanium oxide layer, or an aluminum oxide layer. The organic layer TFE2 may include an acryl-based organic layer, but the invention is not limited thereto.

The input sensor IS may be disposed on the display panel DP. The input sensor IS may be called a sensor, an input sensing layer, or an input sensing panel. The input sensor IS may include a sensor base layer 210, a first conductive layer 220, a sensing dielectric layer 230, and a second conductive layer 240.

The sensor base layer 210 may be directly disposed on the display panel DP. The sensor base layer 210 may be an inorganic layer that includes at least one selected from silicon nitride, silicon oxynitride, and silicon oxide. Alternatively, the sensor base layer 210 may be an organic layer that includes an epoxy-based resin, an acryl-based resin, or an imide-based resin. The sensor base layer 210 may have a single-layered structure or a multi-layered structure in which layers are stacked along the third direction DR3.

Each of the first and second conductive layers 220 and 240 may have a single-layered structure or a multi-layered structure in which layers are stacked along the third direction DR3. The first and second conductive layers 220 and 240 may include conductive lines that define a mesh-type sensing electrode. The conductive lines may not overlap the opening PDL-OP and may overlap the pixel definition layer PDL.

The single-layered conductive layer may include a metal layer or a transparent conductive layer. The metal layer may include molybdenum, silver, titanium, copper, aluminum, or an alloy thereof. The transparent conductive layer may include transparent conductive oxide, such as ITO, IZO, zinc oxide (ZnO), or IZTO. Alternatively, the transparent conductive layer may include a metal nano-wire, a graphene, or a conductive polymer such as PEDOT.

The multi-layered conductive layer may include metal layers that are sequentially stacked. The metal layers may include, for example, tri-layered structure of titanium/aluminum/titanium. The multi-layered conductive layer may include at least one metal layer and at least one transparent conductive layer.

The sensing dielectric layer 230 may be disposed between the first conductive layer 220 and the second conductive layer 240. The sensing dielectric layer 230 may include an inorganic layer. The inorganic layer may include at least one selected from aluminum oxide, titanium oxide, silicon oxide, silicon nitride, silicon oxynitride, zirconium oxide, and hafnium oxide.

Alternatively, the sensing dielectric layer 230 may include an organic layer. The organic layer may include at least one selected from an acryl-based resin, methacryl-based resin, polyisoprene, a vinyl-based resin, an epoxy-based resin, a urethane-based resin, a cellulose-based resin, a siloxane-based resin, a polyimide-based resin, a polyamide-based resin, and a perylene-based resin.

The antireflection layer LF may be disposed on the input sensor IS. The antireflection layer LF may include a partition layer 310, a plurality of color filters 320, and a planarization layer 330.

A material included in the partition layer 310 is not particularly limited as long as the material absorbs light. The partition layer 310 may be a black colored layer, and in an embodiment, the partition layer 310 may include a black coloring agent. The black coloring agent may include a black dye or a black pigment. The black coloring agent may include one of carbon blacks, metals such as chromium, and oxides thereof.

The partition layer 310 may cover the second conductive layer 240 of the input sensor IS. The partition layer 310 may prevent external light from being reflected by the second conductive layer 240. In an embodiment, a portion of the partition layer 310 on the display module DM may be omitted. A zone from which the partition layer 310 is omitted may have a transmittance greater than that of other zones.

An opening 310-OP may be defined in the partition layer 310. The opening 310-OP may overlap the first electrode AE of the light-emitting element LD. One of a plurality of color filters 320 may overlap the first electrode AE of the light-emitting element LD. The one of a plurality of color filters 320 may cover the opening 310-OP. Each of a plurality of color filters 320 may be in contact with the partition layer 310.

The planarization layer LF may cover the partition layer 310 and a plurality of color filters 320. The planarization layer 330 may include an organic material and may have a planarized top surface. In an embodiment of the invention, the planarization layer 330 may be omitted.

Figure 6B:
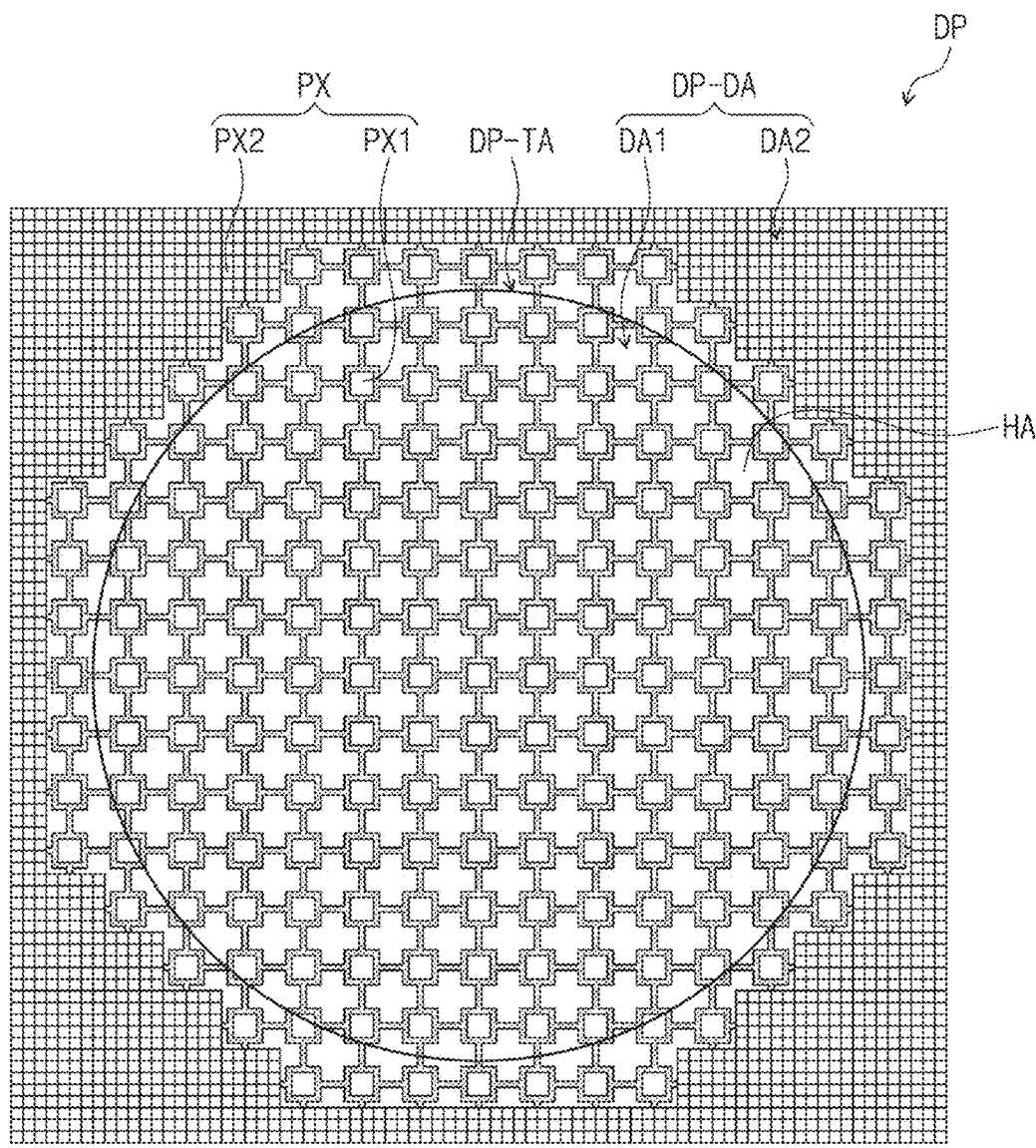
FIG. 6B illustrates an enlarged plan view partially showing a display panel according to an embodiment of the invention.
Figure 6B:
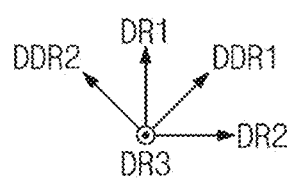
Figure 6C:
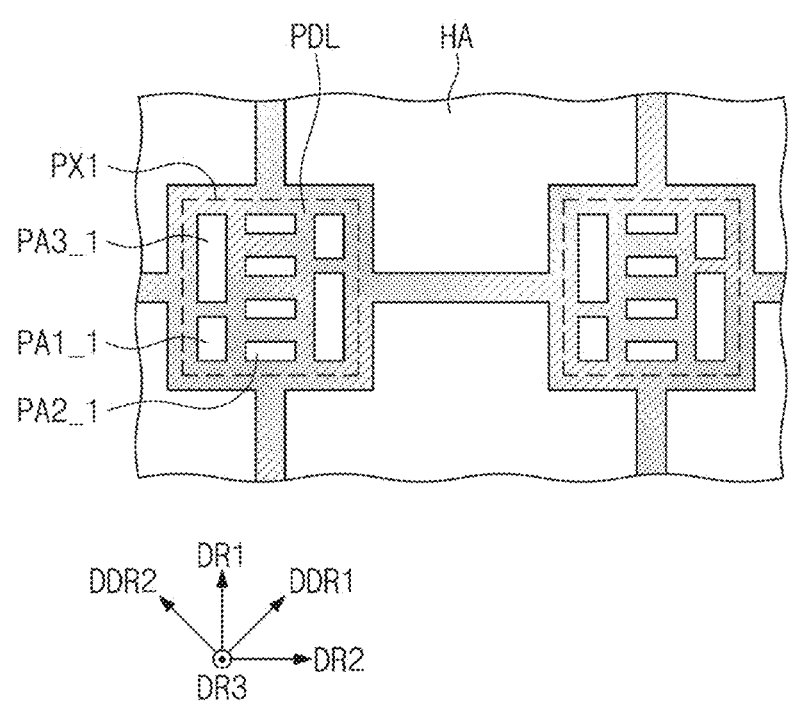
FIG. 6C illustrates an enlarged plan view partially showing a display panel according to an embodiment of the invention.

FIG. 6A illustrates a plan view showing the display panel DP according to an embodiment of the invention. FIG. 6B illustrates an enlarged plan view partially showing the display panel DP according to an embodiment of the invention. FIG. 6C illustrates an enlarged plan view partially showing the display panel DP according to an embodiment of the invention.

Referring to FIG. 6A, in an embodiment, the display panel DP may include the display region DP-DA and the non-display region DP-NDA. The display region DP-DA and the non-display region DP-NDA may be divided or defined based on the presence or absence of a pixel PX. The pixel PX may be disposed on the display region DP-DA. A scan driver SDV, a data driver, and an emission driver EDV may be disposed on the non-display region NDA. The data driver may be a portion of circuits configured on the driver chip DIC.

In an embodiment, the signal transmission region DP-TA may be a zone whose resolution is less than that of the display region DP-DA. In an embodiment, for example, the number of pixels per unit area may be less in the signal transmission region DP-TA than in the display region DP-DA. An optical signal may be transmitted through a portion of the signal transmission region DP-TA, which is a portion where no pixel is provided.

The display panel DP includes a first area AA1, a second area AA2, and a bending area BA that are divided from each other in the second direction DR2. The second area AA2 and the bending area BA may be a portion of the non-display region DP-NDA. The bending area BA may be disposed between the first area AA1 and the second area AA2.

The first area AA1 is a zone that corresponds to the display surface DS shown in FIG. 1A. The first area AA1 may include a first non-folding region NFA10, a second non-folding region NFA20, and a folding region FAO. The first non-folding region NFA10, the second non-folding region NFA20, and the folding region FAO may respectively correspond to the first non-folding region NFA1, the second non-folding region NFA2, and the folding region FA of FIG. 1C.

The bending area BA and the second area AA2 may each have a length in the first direction DR1 less than a length in the first direction DR1 of the first area AA1. As the bending area BA has a smaller length in the first direction DR1 than the first area AA1, the bending area BA may be more effectively bendable.

The display panel DP may include a plurality of pixels PX, a plurality of scan lines SL1 to SLm, a plurality of data lines DL1 to DLn, a plurality of emission lines EL1 to ELm, first and second control lines CSL1 and CSL2, a power line PL, and a plurality of pads PD. Herein, "m" and "n" are natural numbers. The pixels PX may be connected to the scan lines SL1 to SLm, the data lines DL1 to DLn, and the emission lines EL1 to ELm.

The scan lines SL1 to SLm may extend in the second direction DR2 and be connected to the scan driver SDV. The data lines DL1 to DLn may extend in the second direction DR2 and be connected to the data driver DDV through the bending area BA. The emission lines EL1 to ELm may extend in the first direction DR1 and be connected to the emission driver EDV.

The power line PL may include a segment that extends in the second direction DR2 and a segment that extends in the first direction DR1. The extending segment in the first direction DR1 may be located at a different level from that of the extending segment in the second direction DR2. The extending segment in the second direction DR2 of the power line PL may extend through the bending area BA toward the second area AA2. The power line PL may provide the pixels PX with a first voltage.

The first control line CSL1 may be connected to the scan driver SDV, and may extend through the bending area BA toward a bottom end of the second area AA2. The second control line CSL2 may be connected to the emission driver EDV, and may extend through the bending area BA toward the bottom end of the second area AA2.

When viewed in a plan view, the pads PD may be disposed adjacent to the bottom end of the second area AA2. The driver chip DIC, the power line PL, the first control line CSL1, and the second control line CSL2 may be connected to the pads PD. The integrated circuit board PCB may be electrically connected through an anisotropic conductive adhesion layer to the pads PD.

FIG. 6B shows a plan view showing some of the pixels PX illustrated in FIG. 6A, that is, the pixels PX that are adjacent to the signal transmission region DP-TA. FIG. 6C shows an enlarged view partially showing the pixels in FIG. 6B.

Referring to FIGS. 6A and 6B, in an embodiment, the pixels PX may include a plurality of first pixels PX1 and a plurality of second pixels PX2. The first pixels PX1 may be disposed on a first display region DA1. The second pixels PX2 may be disposed on a second display region DA2. The first display region DA1 may be a zone that corresponds to the signal transmission region DP-TA. The display region DP-DA may have the second display region DA2 at a zone other than the signal transmission region DP-TA.

The first pixels PX1 may be arranged in a matrix shape on the first display region DA1. In an embodiment, for example, the first pixels PX1 may be arranged in the first direction DR1 and the second direction DR2. However, the arrangement of the first pixels PX1 is not particularly limited.

The second pixels PX2 may be arranged in a matrix shape on the second display region DA2. In an embodiment, for example, the second pixels PX2 may be arranged in the first direction DR1 and the second direction DR2. However, the arrangement of the second pixels PX2 is not particularly limited. In an embodiment, for example, the second pixels PX2 may be disposed in a first diagonal direction DDR1 and a second diagonal direction DDR2. The first diagonal direction DDR1 may be defined to indicate a direction that intersect the first and second directions DR1 and DR2 on a plane formed by the first and second directions DR1 and DR2. The second diagonal direction DDR2 may be defined to indicate a direction that intersects the first diagonal direction DDR1 on a plane formed by the first and second directions DR1 and DR2. In an embodiment, for example, the first and second directions DR1 and DR2 may orthogonally intersect each other, and the first and second diagonal directions DDR1 and DDR2 may orthogonally intersect each other.

The first display region DA1 may display an image through the first pixels PX1. The first display region DA1 may display an image through the second pixels PX2. In an embodiment, light generated from the first pixels PX1 and the second pixels PX2 may allow the display region DP-DA to display an image. When viewed in a plan view, the second pixels PX2 may have their shapes different from those of the first pixels PX1.

The display panel DP may include a plurality of transmission areas HA. The transmission areas HA may be disposed between the first pixels PX1. In an embodiment, for example, the transmission areas HA may each have a cross shape, but no limitation is imposed on the shape of the transmission areas HA. The transmission areas HA may be disposed around corresponding first pixels PX1. The transmission areas HA may be located in the first and second diagonal directions DDR1 and DDR2 around corresponding first pixels PX1.

In an embodiment, for example, the first pixels PX1 may have a tetragonal shape with sides parallel to the first direction DR1 and sides parallel to the second direction DR2. The transmission areas HA may be disposed adjacent to vertices of corresponding first pixels PX1, and thus may be located in the first and second diagonal directions DDR1 and DDR2 around corresponding first pixels PX1. However, the arrangement of the transmission areas HA is not particularly limited.

The transmission areas HA may have an optical transmittance greater than those of the first and second pixels PX1 and PX2. The electronic module (see ELM of FIG. 2) disposed below the first display region DA1 may be provided with light that passes through the transmission areas HA.

An image may be displayed by the first pixels PX1 on the first display region DA1, and an optical signal may be provided through the transmission areas HA to the electronic module ELM. Therefore, while the first display region DA1 displays an image, the electronic module ELM to which an optical signal is provided may operate as a specific function.

Referring to FIG. 6C, the first pixel PX1 may include a plurality of emission areas PA1_1, PA1_2, and PA1_3 that display a plurality of colors. The emission areas PA1_1, PA1_2, and PA1_3 may include a plurality of first emission areas PA1_1, a plurality of second emission areas PA2_1, and a plurality of third emission areas PA3_1.

In an embodiment, for example, the first pixel PX1 may include two first emission areas PA1_1, four second emission areas PA2_1, and two third emission areas PA3_1. However, the number of the first, second, and third emission areas PA1_1, PA2_1, and PA3_1 disposed on the first pixel PX1 is not particularly limited.

In an embodiment, for example, the first emission areas PA1_1 may exhibit red colors, the second emission areas PA2_1 may exhibit green colors, and the third emission areas PA3_1 may exhibit blue colors. However, the colors exhibited from the first, second, and third emission areas PA1_1, PA2_1, and PA3_1 are not particularly limited.

The first, second, and third emission areas PA1_1, PA2_1, and PA3_1 may each have a rectangular shape, but the shape of the first, second, and third emission areas PA1_1, PA2_1, and PA3_1 is not particularly limited.

In an embodiment, the first, second, and third emission areas PA1_1, PA2_1, and PA3_1 may be divided or separated from each other by the pixel definition layer PDL. In an embodiment, the pixel definition layer PDL may not be disposed on the transmission area HA.

In an embodiment, as shown in FIG. 6C, the first emission areas PA1_1 and the third emission areas PA3_1 may extend in the first direction DR1. A pair of first and third emission areas PA1_1 and PA3_1 may be arranged in a way such that the third emission area PA3_1 is disposed above the first emission area PA1_1 a plan view. Another pair of first and third emission areas PA1_1 and PA3_1 may be arranged in a way such that the first emission area PA1_1 is disposed above the third emission area PA3_1 in a plan view. The pair of first and third emission areas PA1_1 and PA3_1 may be spaced apart in the second direction DR2 from the another pair of first and third emission areas PA1_1 and PA3_1.

The second emission areas PA2_1 may extend in the second direction DR2, and may be arranged in the first direction DR1. The second emission areas PA2_1 may be disposed between the pair of first and third emission areas PA1_1 and PA3_1 and the another pair of first and third emission areas PA1_1 and PA3_1.

Figure 7A:
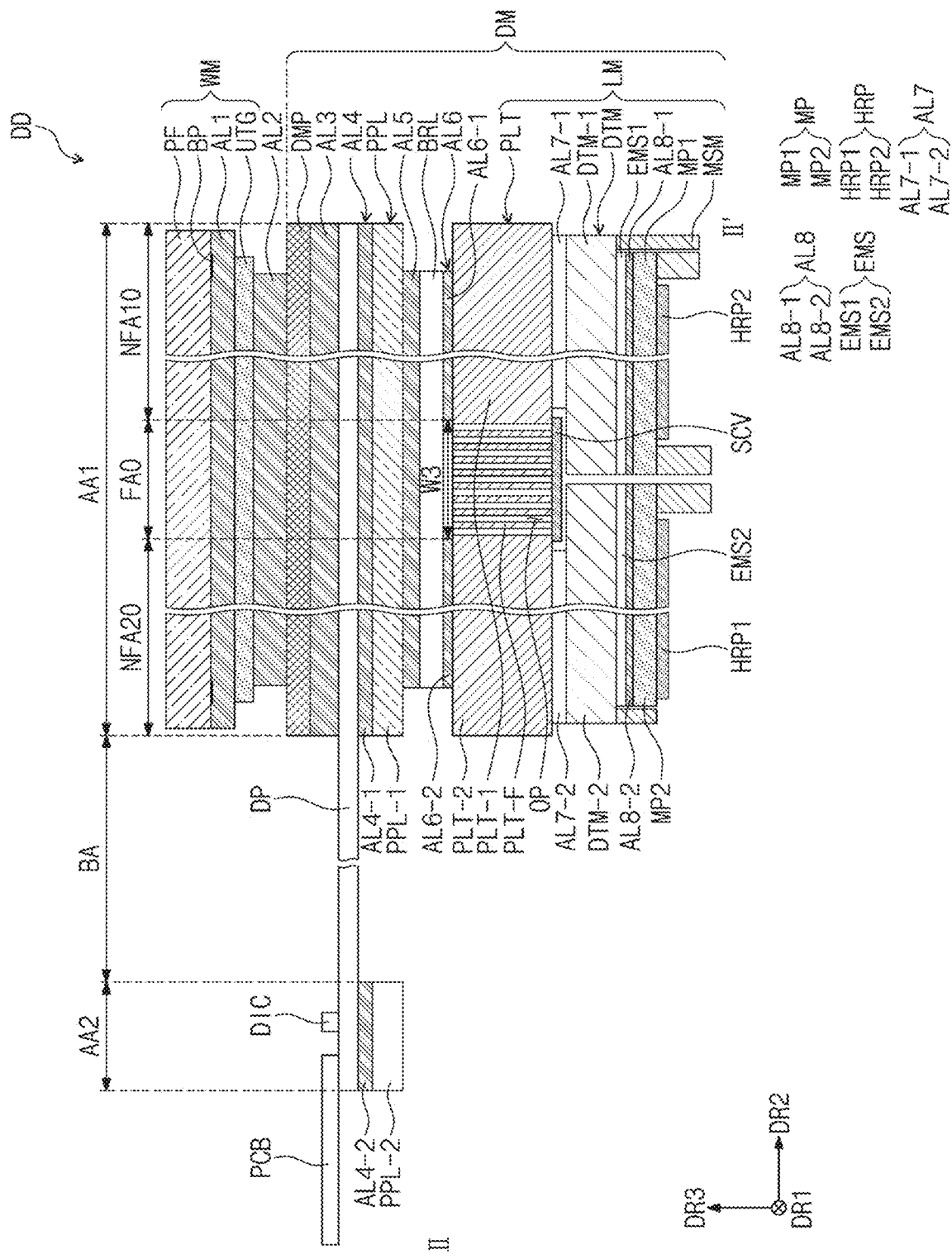
FIG. 7A illustrates a cross-sectional view showing a display device according to an embodiment of the invention.
Figure 7B:
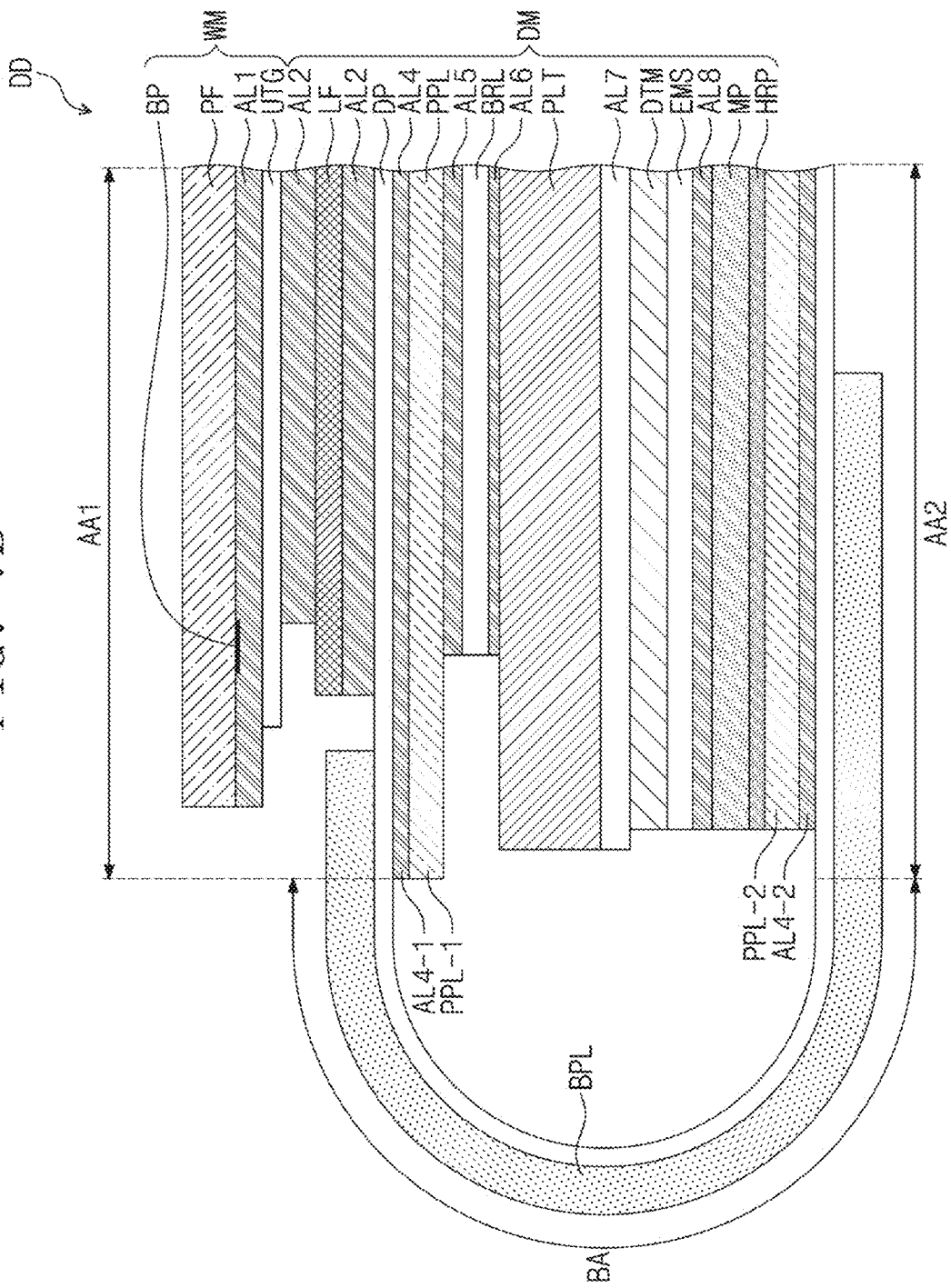
FIG. 7B illustrates a cross-sectional view showing a display device according to an embodiment of the invention.
Figure 7C:
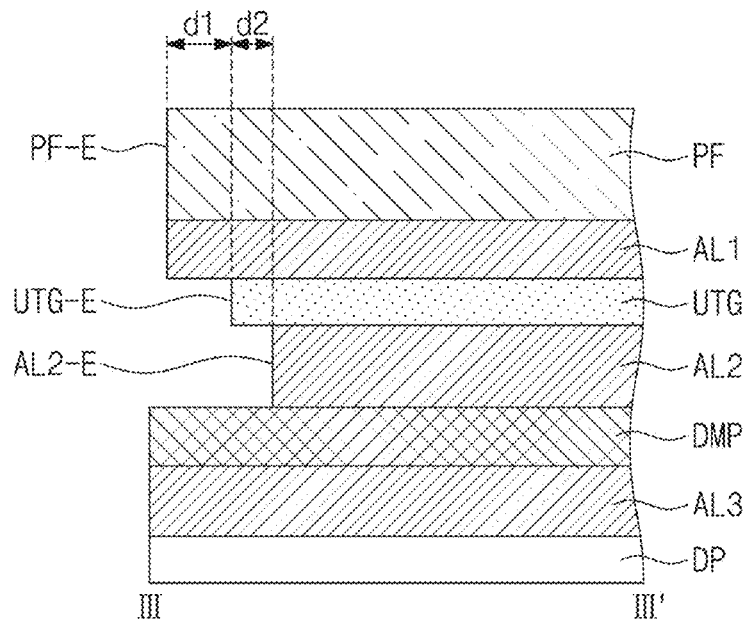
FIGS. 7C and 7D illustrate cross-sectional views partially showing a display device according to an embodiment of the invention.
Figure 7D:
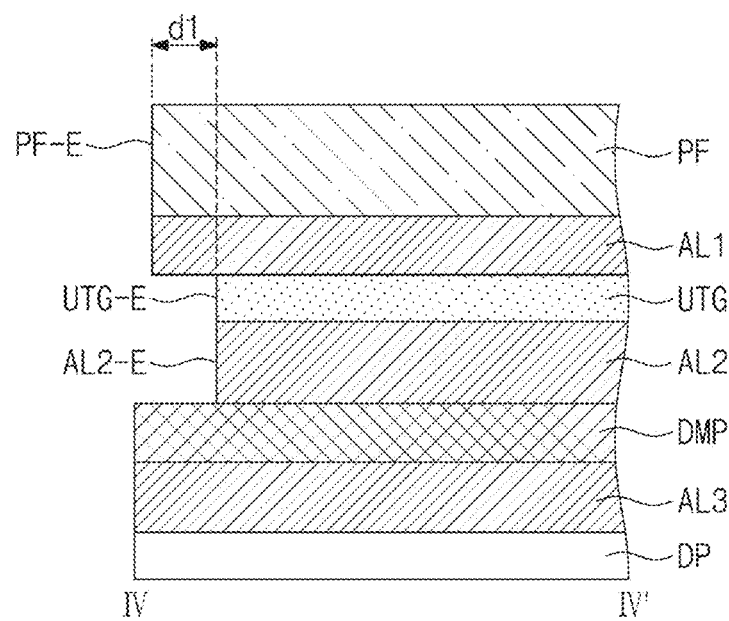

FIG. 7A illustrates a cross-sectional view showing the display device DD according to an embodiment of the invention. FIG. 7B illustrates a cross-sectional view showing the display device DD according to an embodiment of the invention. FIGS. 7C and 7D illustrate cross-sectional views partially showing the display device DD according to an embodiment of the invention. FIG. 7A shows a cross-section that corresponds to that taken along line II-IF of FIG. 6A. FIG. 7B shows a cross-sectional view partially showing a bent state of the bending area BA shown in FIG. 7A. FIG. 7A shows a state where the display panel DP of FIG. 7A is unfolded before being bent, and installed on the electronic device ED. In an embodiment, as illustrated in FIG. 7B, the first area AA1 and the second area AA2 of the display panel DP may be located at different imaginary planes even in a state where the electronic device ED is unfolded as shown in FIG. 1A. A bent shape of the bending area BA will be described below with reference to FIG. 7B. FIG. 7C shows a cross-section that corresponds to that taken along line of FIG. 6A. FIG. 7D shows a cross-section that corresponds to that taken along line IV-IV' of FIG. 6A.

Referring to FIGS. 7A and 7B, an embodiment of the display device DD may include the window module WM and the display module DM.

The window module WM may include an ultra thin glass substrate UTG, a window protection layer PF disposed on the ultra thin glass substrate UTG, and a bezel pattern BP disposed on a bottom surface of the window protection layer PF. In an embodiment, the window protection layer PF may include a plastic film. The window module WM may further include an adhesion layer AL1 (referred to hereinafter as a first adhesion layer) that attaches the window protection layer PF to the ultra thin glass substrate UTG.

The bezel pattern BP may overlap the non-display region DP-NDA illustrated in FIG. 2. The bezel pattern BP may be disposed on either one surface of the ultra thin glass substrate UTG or one surface of the window protection layer PF. FIG. 7A shows an embodiment where the bezel pattern BP is disposed on the bottom surface of the window protection layer PF. The invention, however, is not limited thereto, and alternatively, the bezel pattern BP may be disposed on a top surface of the window protection layer PF. The bezel pattern BP may a colored light-shield layer formed by coating, for example. The bezel pattern BP may include a base material and a dye or pigment mixed in the base material. The bezel pattern BP may have a closed line shape when viewed in a plan view.

In an embodiment, when viewed in a plan view, the ultra thin glass substrate UTG may have an edge (see UTG-E of FIG. 7C) that does not overlap the bezel pattern BP. In such an embodiment, the edge UTG-E of the ultra thin glass substrate UTG is exposed from the bezel pattern BP, and an inspection apparatus may inspect fine cracks that occur at the edge UTG-E of the ultra thin glass substrate UTG. The inspection apparatus may include a microscope. When, on the top surface of the window protection layer PF, the inspection apparatus is used to capture the edge UTG-E of the ultra thin glass substrate UTG, it may be possible to identify the crack that begins from the edge UTG-E of the ultra thin glass substrate UTG. The invention, however, is not limited thereto, and alternatively, the bezel pattern BP may overlap the edge UTG-E of the ultra thin glass substrate UTG.

The ultra thin glass substrate UTG may have a thickness in a range of about 15 micrometers ($\mu$m) to about 45 $\mu$m. The ultra thin glass substrate UTG may be a chemically strengthened glass. Even when the ultra thin glass substrate UTG performs repeated folding and unfolding operations, the occurrence of wrinkles in the ultra thin glass substrate UTG may be minimized or prevented.

The window protection layer PF may have a thickness in a range of about 50 $\mu$m to about 80 $\mu$m. The window protection layer PF may include polyimide, polycarbonate, polyamide, triacetylcellulose, polymethylmethacrylate, or polyethylene terephthalate. Although not shown, at least one selected from a hard coating layer, an anti-fingerprint layer, and an antireflection layer may be further provided on a top surface of the window protection layer PF.

The first adhesion layer AL1 may be a pressure sensitive adhesive film ("PSA") or an optically clear adhesive ("OCA"). The adhesion layers to be described hereinbelow may also be identical to the first adhesion layer AL1 and may include an ordinary or conventional adhesive.

The first adhesion layer AL1 may be separated from the ultra thin glass substrate UTG. The window protection layer PF may have strength less than that of the ultra thin glass substrate UTG, and thus scratches may be relatively easily produced on the window protection layer PF. After the separation of the first adhesion layer AL1 and the protection film PF, a window protection layer PF may be newly attached to the ultra thin glass substrate UTG.

Although not shown, the window protection layer PF may include a plastic resin layer that is disposed directly on a top surface of the ultra thin glass substrate UTG. An insert molding method may be used to form the plastic resin layer in contact with the top surface of the ultra thin glass substrate UTG. Before the plastic resin layer is formed, the bezel pattern BP may be formed on the top surface of the ultra thin glass substrate UTG. Then, the plastic resin layer may be formed to cover the bezel pattern BP.

Although not shown, a hard coating layer may be disposed on the window protection layer PF. The hard coating layer may be a functional layer that is disposed on an uppermost outer surface of the display device DD and increases usage of the display device DD. In an embodiment, for example, the hard coating layer may improve anti-fingerprint properties, pollution-free properties, and/or anti-scratch properties.

The display module DM includes an impact resistance layer DMP, a display panel DP, a panel protection layer PPL, a barrier layer BRL, and a lower member LM. The lower member LM may include a support layer PLT, a cover layer SCV, a digitizer DTM, an electromagnetic shield layer EMS, a lower metal plate MP, a thermal radiation layer HRP, and an electromagnetic shield sheet MSM. The display module DM may include second to eighth adhesion layers AL2 to AL8. The second to eighth adhesion layers AL2 to AL8 may include an adhesive, such as a PSA or an OCA. In an embodiment of the invention, one or more of the components discussed above may be omitted. In an embodiment, for example, the lower metal plate MP and the eighth adhesion layer AL8 related thereto may be omitted. In an embodiment, for example, the thermal radiation layer HRP and the electromagnetic shield sheet MSM may be omitted. Although only the display panel DP is illustrated in FIG. 7A, the input sensor IS and the antireflection layer LF may be further disposed on the display panel DP as shown in FIG. 4.

The impact resistance layer DMP may be disposed on the display panel DP, and may operate a function that protects the display panel DP against external impact. The impact resistance layer DMP may allow the display panel DP to have increased properties of impact resistance and may prevent the display panel DP from downwardly sinking caused by a hole of the lower member LM, which hole is formed corresponding to the signal transmission region (see DP-TA of FIG. 6A) of the display panel DP. The second adhesion layer AL2 attaches the impact resistance layer DMP to the window module WM, and the third adhesion layer AL3 attaches the impact resistance layer DMP to the display panel DP.

Referring to FIGS. 7C and 7D, when viewed in a plan view, the edge UTG-E of the ultra thin glass substrate UTG may be disposed inwardly more than an edge PF-E of the window protection layer PF. In an embodiment, for example, compared to the edge PF-E of the window protection layer PF, the edge UTG-E of the ultra thin glass substrate UTG may be placed adjacent to (or disposed inwardly toward) the display region (see DP-DA of FIG. 6A). The folding operation of the display device DD may induce a variation in positional relationship between layers included in the display device DD, but according to an embodiment of the invention, the edge UTG-E of the ultra thin glass substrate UTG may be disposed more inwardly than the edge PF-E of the window protection layer PF, and thus even when there is a variation in positional relationship between layers included in the display device DD, it may be less likely that the edge UTG-E of the ultra thin glass substrate UTG protrudes more outwardly than the edge PF-E of the window protection layer PF. Accordingly, it may be less likely that that external impact propagates through the edge UTG-E of the ultra thin glass substrate UTG. As a result, there may be a reduction in possibility of occurrence of crack at the ultra thin glass substrate UTG. A first distance d1 between the edge UTG-E of the ultra thin glass substrate UTG and the edge PF-E of the window protection layer PF may be in a range of about 180 μm to about 250 μm, for example, about 210 μm.

Referring to FIGS. 6A and 7C, on a cross-section that corresponds to the non-folding region NFA20, the second adhesion layer AL2 may have an edge AL2-E that is disposed more inwardly than the edge UTG-E of the ultra thin glass substrate UTG. In an embodiment, for example, compared to the edge UTG-E of the ultra thin glass substrate UTG, the edge AL2-E of the second adhesion layer AL2 may be disposed adjacent to the display region DP-DA. According to an embodiment of the invention, as the edge AL2-E of the second adhesion layer AL2 is disposed more inwardly than the edge UTG-E of the ultra thin glass substrate UTG, it may be possible to prevent the ultra thin glass substrate UTG from suffering from buckling issues during the folding operation of the display device DD. A second distance d2 between the edge AL2-E of the second adhesion layer AL2 and the edge UTG-E of the ultra thin glass substrate UTG may be in a range of about 170 μm to about 230 μm, for example, about 190 μm.

Referring to FIGS. 6A and 7D, on a cross-section that corresponds to the folding region FAO, the second adhesion layer AL2 may have an edge AL2-E that is substantially aligned with the edge UTG-E of the ultra thin glass substrate UTG. In an embodiment, for example, unlike the non-folding region NFA20, the edge AL2-E of the second adhesion layer AL2 may not be disposed more inwardly than the edge UTG-E of the ultra thin glass substrate UTG, but may be disposed at substantially a same position as (or aligned with) that of the edge UTG-E of the ultra thin glass substrate UTG. Herein, the expression "substantially the same" in terms of thickness, width, interval, or the like may include "physically completely same", and may also include "the same by design and slight difference due to errors possibly occurring during process." According to an embodiment of the invention, on the non-folding regions NFA10 and NFA20 other than the folding region FAO, the buckling issues may be effectively prevented because the edge UTG-E of the ultra thin glass substrate UTG is disposed more inwardly than the edge AL2-E of the second adhesion layer AL2, but on the folding region FAO, the second adhesion layer AL2 may be designed to have its edge AL2-E aligned with the edge UTG-E of the ultra thin glass substrate UTG, and thus it may be possible to increase an adhesive force between the ultra thin glass substrate UTG and the impact resistance layer DMP on the folding region FAO and to prevent delamination caused by adhesion reduction, resulting from repeated folding operations, of the second adhesion layer AL2 that attaches the ultra thin glass substrate UTG and the impact resistance layer DMP.

Referring back to FIGS. 7A and 7B, the panel protection layer PPL may be disposed below the display panel DP. The panel protection layer PPL may protect a lower portion of the display panel DP. The panel protection layer PPL may include a flexible plastic material. In an embodiment, for example, the panel protection layer PPL may include polyethylene terephthalate ("PET"). In an embodiment of the invention, the panel protection layer PPL may not be disposed on the folding region FAO. The panel protection layer PPL may include a first panel protection layer PPL-1 that protects the first area AA1 of the display panel DP and a second panel protection layer PPL-2 that protects the second area AA2 of the display panel DP.

The fourth adhesion layer AL4 attaches the panel protection layer PPL to the display panel DP. The fourth adhesion layer AL4 may include a first part AL4-1 that corresponds to the first panel protection layer PPL-1 and a second part AL4-2 that corresponds to the second panel protection layer PPL-2.

As illustrated in FIG. 7B, when the bending area BA is bent, the second panel protection layer PPL-2 together with the second area AA2 may be disposed below the first area AA1 and the first panel protection layer PPL-1. In such an embodiment, the panel protection layer PPL is not disposed on the bending area BA, such that the bending area BA may be more easily bent.

The bending area BA may have a curvature and a radius of curvature. The radius of curvature may be in a range from about 0.1 millimeter (mm) to about 0.5 mm. A bending protection layer BPL may be disposed on at least the bending area BA. The bending protection layer BPL may overlap the bending area BA, the first area AA1, and the second area AA2. The bending protection layer BPL may be placed on a portion of the first area AA1 and on a portion of the second area AA2.

The bending protection layer BPL may bend together with the bending area BA. The bending protection layer BPL may protect the bending area BA against external impact and may control a neutral surface of the bending area BA. The bending protection layer BPL may control a stress of the bending area BA to allow signal lines on the bending area BA to become close to the neutral surface.

In an embodiment, as illustrated in FIGS. 7A and 7B, the fifth adhesion layer AL5 attaches the panel protection layer PPL to the barrier layer BRL. The barrier layer BTU, may be disposed below the panel protection layer PPL. The barrier layer BRL may increase resistance to a compressive force caused by external suppression. Therefore, the barrier layer BRL may serve to prevent the display panel DP from being deformed. The barrier layer BRL may include a flexible plastic material, such as polyimide or polyethylene terephthalate. In an embodiment, the barrier layer BRL may be a colored film whose optical transmittance is low. The barrier layer BRL may absorb externally incident light. In an embodiment, for example, the barrier layer BRL may be a black plastic film. When the display module DM is viewed from a top side of the window module WM, components disposed below the barrier layer BRL may be invisible to users.

The sixth adhesion layer AL6 attaches the barrier layer BRL to the support layer PLT. The sixth adhesion layer AL6 may include a first adhesion part AL6-1 and a second adhesion part AL6-2. An interval W3, or distance, between the first adhesion part AL6-1 and the second adhesion part AL6-2 corresponds to a width of the folding region FAO and is greater than a gap between first and second digitizers DTM-1 and DTM-2 of the digitizer DTM which will be discussed below. The interval W3 between the first adhesion part AL6-1 and the second adhesion part AL6-2 may be in a range from about 7 mm to about 15 mm, for example, from about 9 mm to about 12 mm. In one embodiment, for example, the interval W3 between the first adhesion part AL6-1 and the second adhesion part AL6-2 may be about 9.65 mm.

In an embodiment, the first adhesion part AL6-1 and the second adhesion part AL6-2 are defined to indicate different segments of one adhesion layer, but the invention is not limited thereto. In an embodiment, the first adhesion part AL6-1 is defined as one adhesion layer (or first adhesion layer), and the second adhesion part AL6-2 may be defined as another adhesion layer (or second adhesion layer).

The support layer PLT is disposed below the barrier layer BRL. The support layer PLT supports components disposed thereon and maintains an unfolding or folding state of the display device DD. The support layer PLT includes a first support part PLT-1 that corresponds to the first non-folding region NFA10 and a second support part PLT-2 that corresponds to the second non-folding region NFA20. The first support part PLT-1 and the second support part PLT-2 are spaced apart from each other in the second direction DR2.

In an embodiment, the support layer PLT may further include a folding part PLT-F which corresponds to the folding region FAO, which is disposed between the first support part PLT-1 and the second support part PLT-2, and in which a plurality of openings OP are defined. As the plurality of openings OP are defined in the folding part PLT-F, it may be possible to reduce stress applied to the support layer PLT during the folding operation illustrated in FIG. 1B or 1C. The plurality of openings OP defined in the folding part PLT-F may be provided in a plurality of rows that are arranged offset from each other.

The support layer PLT may be selected from a material that allows an electromagnetic field generated from the digitizer DTM to pass therethrough with no or minimum loss. The support layer PLT may include a nonmetallic material. The support layer PLT may include plastic, fiber reinforced plastic, or glass. The support layer PLT may include, for example, carbon fiber reinforced plastic ("CFRP"). The first support part PLT-1, the second support part PLT-2, and the folding part PLT-F included in the support layer PLT may include a same material as each other. The first support part PLT-1, the second support part PLT-2, and the folding part PLT-F may constitute or integrally formed as a single unitary unit.

The support layer PLT may have a plurality of openings OP defined in its partial region that corresponds to the folding region FAO. The plurality of openings OP may be defined in the folding part PLT-F of the support layer PLT. The openings OP may increase flexibility of the support layer PLT. The sixth adhesion layer AL6 may be absent on a region that corresponds to the folding region FAO, and thus the support layer PLT may increase in flexibility.

The seventh adhesion layer AL7 and the cover layer SCV are disposed below the support layer PLT. Herein, the seventh adhesion layer AL7 may be referred to as a lower adhesion layer.

The cover layer SCV may have a sheet shape and may be attached to the support layer PLT. The cover layer SCV may have an elastic modulus less than that of the support layer PLT. In an embodiment, for example, the cover layer SCV may include at least one selected from thermoplastic polyurethane ("TPU"), rubber, and silicon. Although not shown, the cover layer SCV may be attached below the support layer PLT through an additional adhesion layer.

The lower adhesion layer AL7 may be disposed below the support layer PLT, and may attach the support layer PLT to the digitizer DTM. The lower adhesion layer AL7 may include a first lower adhesion layer AL7-1 disposed below the first support part PLT-1 and a second lower adhesion layer AL7-2 disposed below the second support part PLT-2.

The digitizer DTM, which is also referred to as an electromagnetic resonance ("EMR"), includes a plurality of coil loops that generate an electromagnetic wave at a preset resonance frequency with an electronic pen. The electromagnetic wave generated from the coil is applied to an LC resonance circuit that is constituted by a capacitor and an inductor (or coil) of the electronic pen. The coil generates a current from the received electromagnetic wave and transmits the generated current to the capacitor. Therefore, the capacitor charges the current that is input from the coil and discharges the charged current to the coil. The coil electromagnetic wave eventually releases the electromagnetic wave at the resonance frequency. The loop coil of the digitizer DTM may re-absorb the electromagnetic wave released from the electronic pen, and therefore it may be possible to determine a position where the electronic pen is close to a touch screen.

The digitizer DTM may include a first digitizer DTM-1 attached below the first lower adhesion layer AL7-1 and a second digitizer DTM-2 attached below the second lower adhesion layer AL7-2. The first digitizer DTM-1 and the second digitizer DTM-2 may be disposed spaced apart from each other with a gap therebetween. The gap may be in a range from about 0.3 mm to about 3 mm. In an embodiment, for example, the gap may be in a range from about 0.4 mm to about 2 mm. The gap may be defined to correspond to the folding region FAO. The digitizer DTM will be discussed in detail below.

The electromagnetic shield layer EMS may be disposed below the digitizer DTM. The electromagnetic shield layer EMS may be provided to block the digitizer DTM from being affected by electromagnetic waves or noise generated from the electronic module ELM and the control module EM that are illustrated in FIG. 2. The electromagnetic shield layer EMS may include a first electromagnetic shield layer EMS1 and a second electromagnetic shield layer EMS2 that respectively correspond to the first digitizer DTM-1 and the second digitizer DTM-2. In an embodiment, the electromagnetic shield layer EMS may be a copper sheet. The electromagnetic shield layer EMS may include a magnetic metal powder ("MMP"). A coating process and a curing process may be employed such that the magnetic metal power may be formed directly on a bottom surface of the digitizer DTM. In an alternative embodiment of the invention, the electromagnetic shield layer EMS may be omitted.

The eighth adhesion layer AL8 attaches the electronic shield layer EMS to the lower metal plate MP. The eighth adhesion layer AL8 may include a first part AL8-1 and a second part AL8-2 that are spaced apart from each other. The lower metal plate MP may include a first lower metal plate MP1 and a second lower metal plate MP2 that are respectively attached to the first part AL8-1 and the second part AL8-2. The lower metal plate MP may increase thermal radiation properties, and may protect an upper portion of the lower metal plate MP against an external pressure generated in an attachment process when the second panel protection layer PPL-2 is fixed after being bent as illustrated in FIG. 7B.

The thermal radiation layer HRP may be disposed below the lower metal plate MP. The thermal radiation layer HRP may be a sheet whose thermal conductivity is high. The thermal radiation layer HRP may include a metal or any alloy thereof, such as copper, copper alloy, or graphite.

The thermal radiation layer HRP may include a first thermal radiation layer HRP1 and a second thermal radiation layer HRP2. The first thermal radiation layer HRP1 and the second thermal radiation layer HRP2 may be spaced apart from each other with a certain interval. An interval between the first thermal radiation layer HRP1 and the second thermal radiation layer HRP2 may be in a range from about 0.4 mm to about 2 mm, but the invention is not limited thereto. The first thermal radiation layer HRP1 and the second thermal radiation layer HRP2 may be disposed to have an interval that corresponds to the folding region FAO.

The electromagnetic shield sheet MSM may be disposed below the digitizer DTM. The electromagnetic shield sheet MSM may include a plurality of parts. At least one of the plurality of parts may have a thickness different from those of other parts. The plurality of parts of the electromagnetic shield sheet MSM may be disposed to correspond to a step difference of a bracket (not shown) disposed below the display device DD. The electromagnetic shield sheet MSM may be disposed below the digitizer DTM and located at a position where the electromagnetic shield layer EMS is not disposed. In an embodiment, the electromagnetic shield sheet MSM may be disposed below the lower metal plate MP and located at a position where the thermal radiation layer HRP is disposed. The electromagnetic shield sheet MSM may have a structure in which at least one electromagnetic shield layer and at least one adhesion layer are stacked alternately one on another. The electromagnetic shield sheet MSM shields an electromagnetic wave generated from a magnetic body (not shown) disposed thereunder. The electromagnetic shield sheet MSM may prevent the digitizer DTM from interference caused by the electromagnetic wave generated from the magnetic body. Although not shown, a printed circuit board ("PCB") may be disposed on the electromagnetic shield sheet MSM.

Although not shown, a through hole may be defined or formed in some components of the lower member LM. The through hole may overlap the signal transmission region DP-TA of FIG. 2. In an embodiment, for example, the through hole may be defined through layers from the fifth adhesion layer AL5 to the lower metal plate MP. The formation of the through hole may allow an optical signal path to be free of a structure that blocks an optical signal. The through hole may increase a reception efficiency of optical signals of the electronic module (see EM of FIG. 2).

Figure 8:
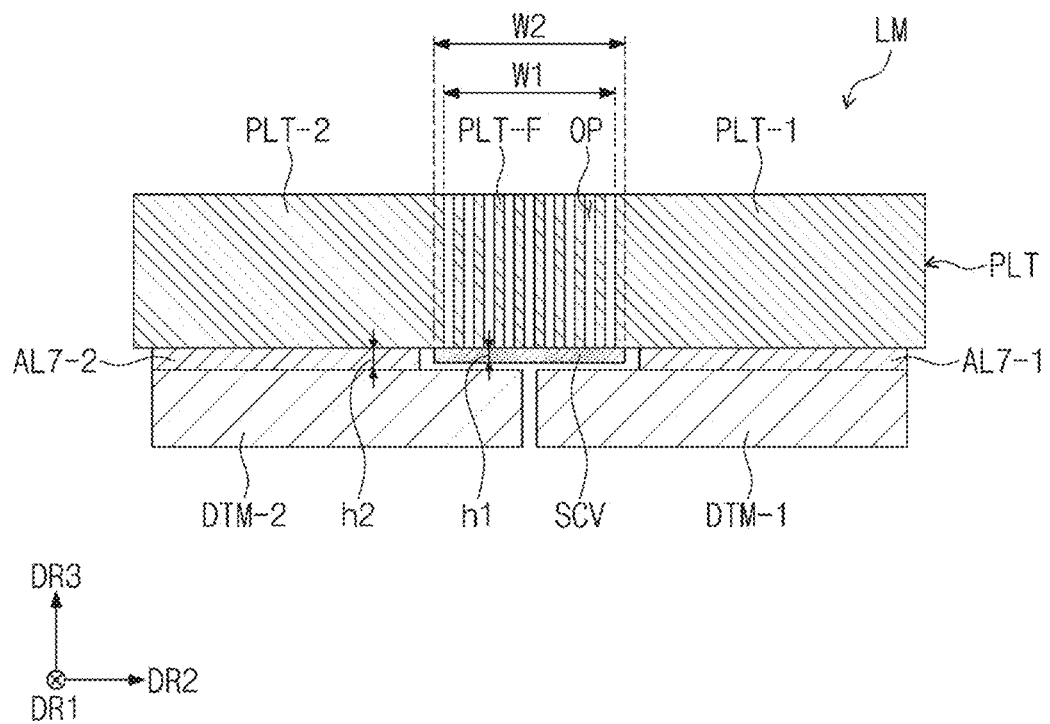
FIG. 8 illustrates a cross-sectional view a lower member according to an embodiment of the invention.

FIG. 8 illustrates a cross-sectional view the lower member LM according to an embodiment of the invention. FIG. 8 shows the support layer PLT, the cover layer SCV, the lower adhesion layer AL7, and the digitizer DTM of the lower member LM shown in FIG. 7A, but the electromagnetic shied layer EMS, the lower metal plate MP, the thermal radiation layer HRP, and the electromagnetic shield sheet MSM of the lower member LM shown in FIG. 7A are omitted for convenience of illustration.

Referring to FIG. 8, the support layer PLT includes the first support part PLT-1, the folding part PLT-F, and the second support part PLT-2 that are sequentially arranged. A plurality of openings OP are defined in the folding part PLT-F.

The cover layer SCV may have a sheet shape and may be attached to the support layer PLT. The cover layer SCV may be attached below the folding part PLT-F of the support layer PLT. The cover layer SCV may be attached below the folding part PLT-F, and may block introduction of moisture and foreign substances into the plurality of openings OP defined in the folding part PLT-F. The cover layer SCV may include a material whose elastic modulus is low, for example, thermoplastic polyurethane. The cover layer SCV may be attached below the folding part PLT-F of the support layer PLT, and may not be disposed below most of the first support part PLT-1 and the second support part PLT-2.

The lower adhesion layer AL7 may be disposed below the support layer PLT and may attach the support layer PLT to the digitizer DTM. The lower adhesion layer AL7 may be in contact with a bottom surface of the support layer PLT and with a top surface of the digitizer DTM. In an embodiment, for example, for the support layer PLT and the digitizer DTM that are attached to each other through the lower adhesion layer AL7, the support layer PLT and the digitizer DTM may have not therebetween any component other than the lower adhesion layer AL7.

When viewed in a plan view, the lower adhesion layer AL7 may not overlap the cover layer SCV. In an embodiment, for example, when viewed in a thickness direction of the lower member LM, the lower adhesion layer AL7 and the cover layer SCV may not overlap each other. The lower adhesion layer AL7 may include the first lower adhesion layer AL7-1 disposed below the first support part PLT-1 and the second lower adhesion layer AL7-2 disposed below the second support part PLT-2. The first lower adhesion layer AL7-1 and the second lower adhesion layer AL7-2 may be disposed spaced apart from each other, and the cover layer SCV may be disposed on a location where the first lower adhesion layer AL7-1 and the second lower adhesion layer AL7-2 are spaced apart from each other.

In such an embodiment where the lower adhesion layer AL7 does not overlap the cover layer SCV and directly attaches the support layer PLT to the digitizer DTM, it may be possible to increase a thickness of the lower adhesion layer AL7. In an embodiment, the lower adhesion layer AL7 may have a thickness h2 greater than a thickness h1 of the cover layer SCV. In an embodiment, the thickness h2 of the lower adhesion layer AL7 may be in a range from about 15 μm to about 25 μm. In one embodiment, for example, the thickness h2 of the lower adhesion layer AL7 may be about 20 μm. In an embodiment, the thickness h1 of the cover layer SCV may be in a range from about 10 μm to about 20 μm. In one embodiment, for example, the thickness h1 of the cover layer SCV may be about 16 μm. In such an embodiment where the thickness h2 of the lower adhesion layer AL7 is greater than the thickness h1 of the cover layer SCV, the cover layer SCV may be disposed spaced apart from the top surface of the digitizer DTM. The cover layer SCV may be in contact with the bottom surface of the support layer PLT and may not be in contact with the top surface of the digitizer DTM.

A width in one direction of the cover layer SCV may be greater than a width in the one direction of the folding part PLT-F. In an embodiment, when viewed in the second direction DR2 along which are arranged the first support part PLT-1, the folding part PLT-F, and the second support part PLT-2, the folding part PLT-F may have a first width W1 and the cover layer SCV may have a second width W2. The first width W1 may be less than the second width W2. In an embodiment, the first width W1 may be less as much as (or by a distance in a range of) about 0.5 mm to about 3 mm than the second width W2. In an embodiment, the first width W1 may be in a range from about 6 mm to about 10 mm. In one embodiment, for example, the first width W1 may be about 8.65 mm. In an embodiment, the second width W2 may be in a range from about 9 mm to about 15 mm. In one embodiment, for example, the second width W2 may be about 10.65 mm.

The interval W3 between the first adhesion part AL6-1 and the second adhesion part AL6-2 of the sixth adhesion layer AL6 disposed on the support layer PLT may be greater than the first width W1 and less than the second width W2. In one embodiment, for example, the interval W3 between the first adhesion part AL6-1 and the second adhesion part AL6-2 may be about 9.65 mm.

In the lower member LM included in the display device DD according to an embodiment, the cover layer SCV disposed below the support layer PLT may be disposed on a location that corresponds to the folding part PLT-F and may not be disposed on a location below most of the first and second support parts PLT-1 and PLT-2 other than the folding part PLT-F. Therefore, the lower adhesion layer AL7 disposed below the first and second support parts PLT-1 and PLT-2 may directly attach the support layer PLT and the digitizer DTM to each other with no component therebetween. Therefore, in an embodiment of the display device DD, the lower adhesion layer AL7 may have a relatively large thickness, compared to a case where the cover layer SCV is disposed to overlap the first support part PLT-1, the folding part PLT-F, and the second support part PLT-2 of the support layer PLT. Accordingly, it may be possible to increase adhesive forces at interfaces among the lower adhesion layer AL7, the support layer PLT, and the digitizer DTM, and thus durability and water-proof properties of the display device DD may be improved.

Figure 9A:
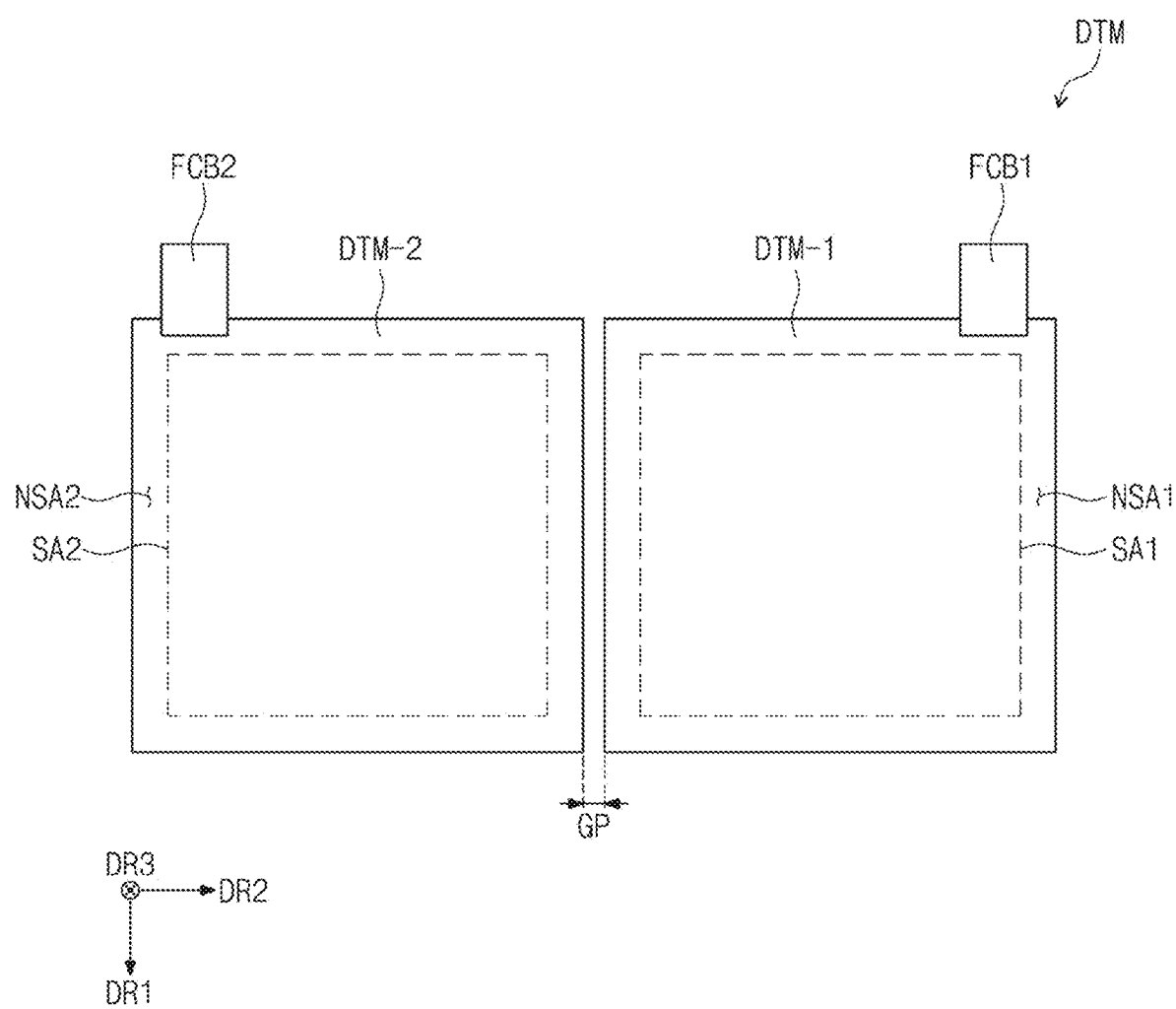
FIG. 9A illustrates a plan view showing a digitizer according to an embodiment of the invention.
Figure 9B:
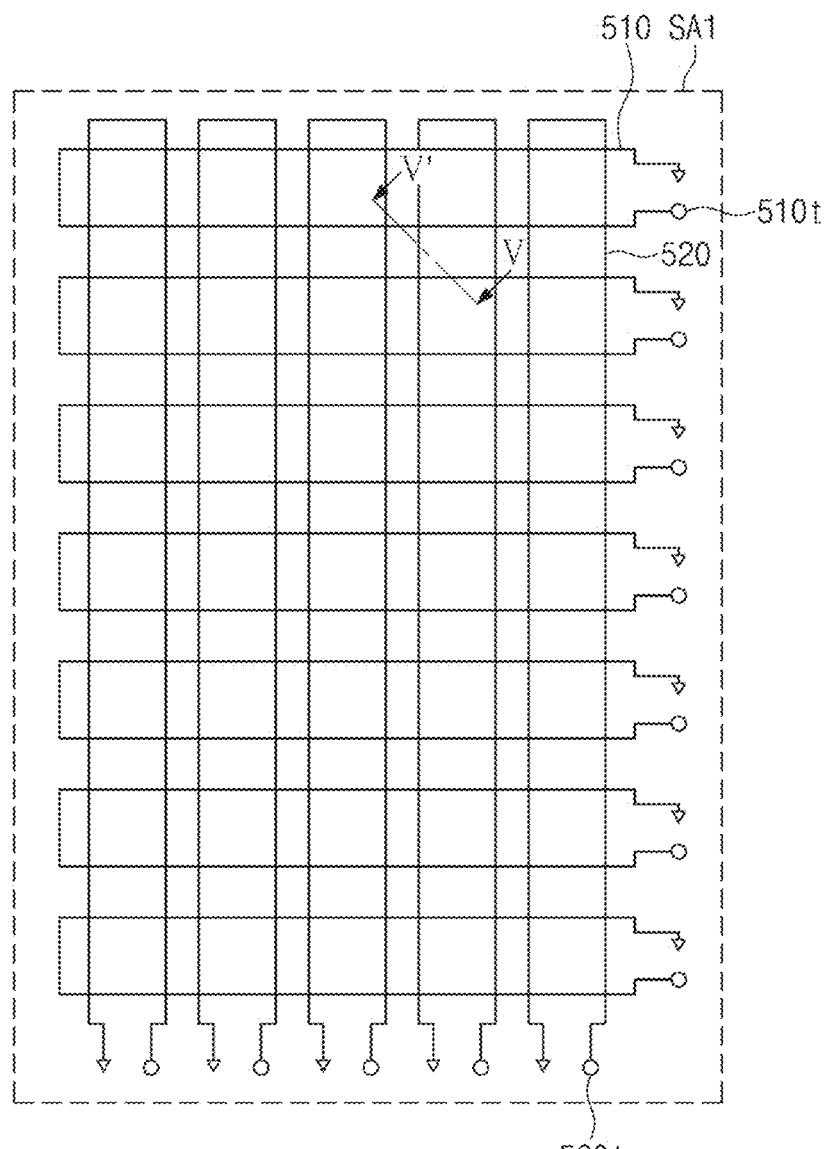
FIG. 9B illustrates a plan view showing a sensing area of a digitizer according to an embodiment of the invention.
Figure 9C:
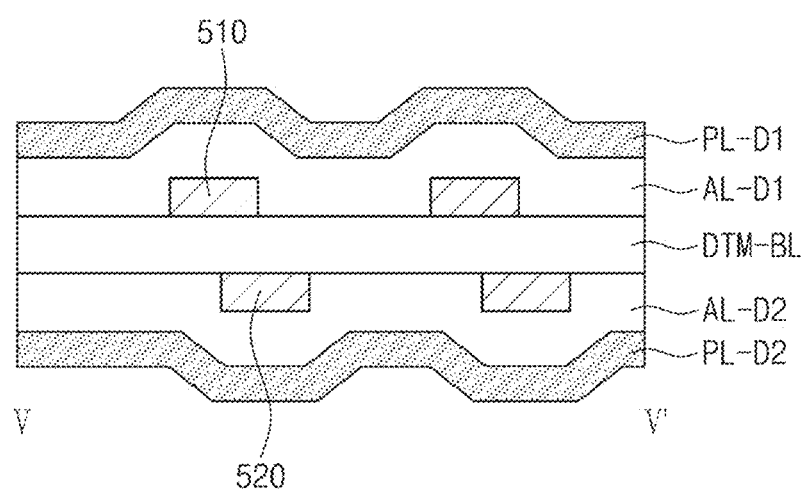
FIG. 9C illustrates a cross-sectional view showing a sensing area of a digitizer according to an embodiment of the invention.
Figure 9D:
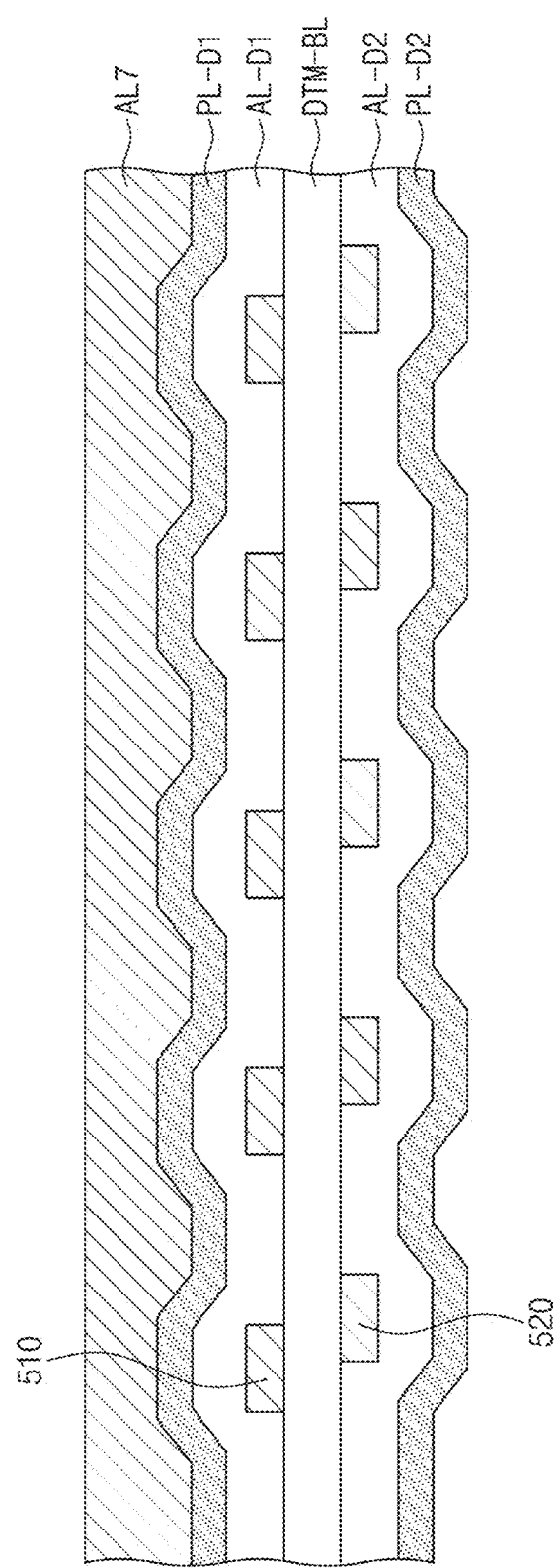
FIG. 9D illustrates a cross-sectional view showing a lower adhesion layer and a portion of a digitizer according to an embodiment of the invention.

FIG. 9A illustrates a plan view showing the digitizer DTM according to an embodiment of the invention. FIG. 9B illustrates a plan view showing a sensing area SA1 of the digitizer DTM according to an embodiment of the invention. FIG. 9C illustrates a plan view showing a sensing area SA1 of the digitizer DTM according to an embodiment of the invention. FIG. 9D illustrates a cross-sectional view showing the lower adhesion layer AL7 and a portion of the digitizer DTM according to an embodiment of the invention.

In an embodiment, as shown in FIG. 9A, the digitizer DTM may include the first digitizer DTM-1 and the second digitizer DTM-2 that are spaced apart from each other. The first digitizer DTM-1 and the second digitizer DTM-2 may be disposed spaced apart from each other with a certain gap GP therebetween. The gap GP may be in a range from about 0.3 mm to about 3 mm. In an embodiment, for example, the gap GP may be in a range from about 0.4 mm to about 2 mm. The gap GP may be defined to correspond to the folding region (see FAO of FIG. 7A).

A first flexible circuit film FCB1 and a second flexible circuit film FCB2 may be electrically connected to the first digitizer DTM-1 and the second digitizer DTM-2, respectively. The first flexible circuit film FCB1 and the second flexible circuit film FCB2 may be connected to a same circuit board. In an embodiment, for example, the first flexible circuit film FCB1 and the second flexible circuit film FCB2 may be connected to the printed circuit board PCB describe above with reference to FIG. 2 or to a main circuit board connected to the printed circuit board PCB. The first flexible circuit film FCB1 and the second flexible circuit film FCB2 may be replaced with a single circuit film.

The first digitizer DTM-1 and the second digitizer DTM-2 may respectively include a first sensing area SA1 and a second sensing area SA2, and may also respectively include a first non-sensing area NSA1 and a second non-sensing area NSA2. The first non-sensing area NSA1 and the second non-sensing area NSA2 may be disposed adjacent to the first sensing area SA1 and the second sensing area SA2, respectively. The first digitizer DTM-1 and the second digitizer DTM-2 may have a same configuration or structure as each other, and thus only the first digitizer DTM-1 will hereinafter be described in detail.

In an embodiment, as shown in FIG. 9B, the first sensing area SA1 may include a plurality of first loop coils 510 (referred to hereinafter as first coils) and a plurality of second loop coils 520 (referred to hereinafter as second coils). The first coils 510 may be referred to as driver coils, and the second coils 520 may be referred to as sensing coils, or the invention is not limited thereto, and this configuration may be arranged vice versa.

Each of the first coils 510 may be arranged along the first direction DR1 and may extend along the second direction DR2. The second coils 520 may each extend along the first direction DR1, and may be arranged spaced apart from each other in the second direction DR2. In an embodiment, differently from that shown in FIG. 9B, neighboring first coils 510 may be arranged to overlap each other. A bridge pattern may be disposed at an intersection between the first coils 510. Neighboring second coils 520 may be arranged to overlap each other. A bridge pattern may be disposed at an intersection between the second coils 520.

An alternating current signal may be sequentially provided to first terminals 510t of the first coils 510. Other terminals different from the first terminals 510t of the first coils 510 may be electrically grounded. Signal lines may be connected to corresponding first terminals 510t of the first coils 510, but the signal lines are not shown in FIG. 5B. The signal lines may be disposed on the first non-sensing area NSA1 shown in FIG. 5A.

When current flows through the first coils 510, a magnetic line of force may be induced between the first coils 510 and the second coils 520. The second coils 520 may detect an induced magnetic line of force discharged from an electronic pen, and second terminals 520t of the second coils 520 may output the magnetic line of force as a detection signal. Other terminals different from the second terminals 520t of the second coils 520 may be electrically grounded. Signal lines may be connected to corresponding second terminals 520t of the second coils 520, but the signal lines are not shown in FIG. 5B. The signal lines may be disposed on the first non-sensing area NSA1 shown in FIG. 5A.

Referring to FIGS. 9A to 9C, the first digitizer DTM-1 includes a base layer DTM-BL, the first coils 510 disposed on one surface of the base layer DTM-BL, and the second coils 520 disposed on other surface of the base layer DTM-BL. The base layer DTM-BL may include a plastic film, such as a polyimide film. The first coils 510 and the second coils 520 may include a metal, such as gold (Au), silver (Ag), copper (Cu), or aluminum (Al).

In an embodiment, protection layers that protect the first coils 510 and the second coils 520 may be disposed on opposing surfaces of the base layer DTM-BL. In an embodiment, the protection layers may include a first protection layer PL-D1 that is disposed on the first coils 510 and is attached through a first adhesion layer AL-D1, and may also include a second protection layer PL-D2 that is disposed on the second coils 520 and is attached through a second adhesion layer AL-D2. Each of the first and second protection layers PL-D1 and PL-D2 may include a plastic, such as a polyimide film.

In an embodiment, as shown in FIG. 9C, the first digitizer DTM-1 may have undulation produced on each of top and bottom surfaces thereof by the first coils 510 and the second coils 520. In an embodiment, the support layer (see PLT of FIG. 8) disposed on the digitizer (see DTM of FIG. 8) may effectively prevent a user from recognizing the undulation produced by the first coils 510 and the second coils 520. In an embodiment, for example, when viewed from top of the display device DD, the support layer PLT may prevent recognition of the first and second coils 510 and 520 disposed below the support layer PLT.

In an embodiment, where the support layer PLT includes a dielectric non-metallic material as described above, a magnetic field may pass through the support layer PLT. Accordingly, the digitizer DTM disposed below the support layer PLT may detect an external input. In a case where the support layer PLT includes a metallic material, the metallic material included in the support layer PLT may interfere with the magnetic field generated from the digitizer DTM and thus the digitizer DTM may problematically decrease in sensibility.

Referring to FIGS. 8 and 9A to 9D, the lower adhesion layer AL7 disposed on the digitizer DTM may cover the undulation produced on the top surface of the digitizer DTM. The lower adhesion layer AL7 may cover undulation produced on a top surface of each of the first digitizer DTM-1 and the second digitizer DTM-2. The first lower adhesion layer AL7-1 may cover the undulation produced on the top surface of the first digitizer DTM-1, and the second lower adhesion layer AL7-2 may cover the undulation produced on the top surface of the second digitizer DTM-2. The lower adhesion layer AL7 may cover undulation, which is produced by the first coils 510, on the top surface of the first digitizer DTM-1.

In an embodiment of the display device DD, the lower adhesion layer AL7 may directly attach the support layer PLT and the digitizer DTM to each other with no component therebetween, and thus the lower adhesion layer AL7 may be designed to have a large thickness. Therefore, the lower adhesion layer AL7 may cover the undulation produced on the digitizer DTM, and the display device DD may be prevented from water-proof degradation caused by line undulation of the digitizer DTM.

According to an embodiment of the invention, a cover layer that prevents introduction of foreign substances may be attached only to a folding part, and a lower adhesion layer may directly attach a support plate and a digitizer to each other with no component therebetween, through the lower adhesion layer having a large thickness. Accordingly, it may be possible to increase an adhesive force of the lower adhesion layer, to cover undulation produced by coils of the digitizer, and to improve durability and water-proof properties of a display device.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device, comprising:
   a display panel which includes a first non-folding region, a second non-folding region, and a folding region between the first non-folding region and the second non-folding region; and
   a lower member below the display panel,
   wherein the lower member includes:
      a support layer below the display panel, wherein the support layer includes a first support part which overlaps the first non-folding region, a second support part which overlaps the second non-folding region, and a folding part which overlaps the folding region, wherein a plurality of openings is defined in the folding part;
      a digitizer below the support layer, wherein the digitizer corresponds to the first support part and the second support part, and the support layer is disposed between the display panel and the digitizer;
      a cover layer between the support layer and the digitizer, wherein the cover layer is attached below the folding part; and
      a lower adhesion layer between the support layer and the digitizer, wherein the lower adhesion layer is below the first support part and the second support part.

2. The display device of claim 1, wherein a thickness of the lower adhesion layer is greater than a thickness of the cover layer.

3. The display device of claim 2, wherein
   the thickness of the lower adhesion layer is in a range of about 15 micrometers to about 25 micrometers, and
   the thickness of the cover layer is in a range of about 10 micrometers to about 20 micrometers.

4. The display device of claim 1, wherein the cover layer includes at least one selected from thermoplastic polyurethane, rubber, and silicon.

5. The display device of claim 1,
   wherein the first support part, the folding part, and the second support part are sequentially arranged along a first direction,
   wherein a first width in the first direction of the folding part is less by a distance in a range of about 0.5 micrometers to about 3 micrometers than a second width in the first direction of the cover layer.

6. The display device of claim 1, wherein the digitizer includes:
   a first digitizer including a first sensing area which corresponds to the first support part; and a second digitizer including a second sensing area which corresponds to the second support part, wherein the second digitizer is spaced apart from the first digitizer.

7. The display device of claim 6, wherein the lower adhesion layer includes:
a first lower adhesion layer in contact with a bottom surface of the first support part and with a top surface of the first digitizer; and
a second lower adhesion layer in contact with a bottom surface of the second support part and with a top surface of the second digitizer.

8. The display device of claim 1, wherein the digitizer includes:
a base layer; and
a plurality of coils on a surface of the base layer,
wherein the lower adhesion layer covers an undulation on a top surface of the digitizer, and the undulation is defined by the plurality of coils.

9. The display device of claim 1, wherein the support layer includes a non-metallic material.

10. The display device of claim 1, wherein the cover layer is in contact with a bottom surface of the folding part and is spaced apart from the digitizer.

11. The display device of claim 1, wherein the lower member further includes:
an electromagnetic shield layer below the digitizer;
a lower metal plate below the electromagnetic shield layer; and
a thermal radiation layer below the lower metal plate.

12. The display device of claim 1, further comprising:
an input sensor directly on the display panel; and
an antireflection layer directly on the input sensor.

13. The display device of claim 12, wherein the antireflection layer includes:
a plurality of color filters; and
a partition layer between the plurality of color filters.

14. The display device of claim 1, wherein the display panel includes:
a display region which includes a first display region and a second display region adjacent to the first display region; and
a peripheral region adjacent to the display region,
wherein the first display region has an optical transmittance relatively greater than an optical transmittance of the second display region.

15. The display device of claim 1, wherein the lower member further includes:
a barrier layer below the display panel;
a first adhesion part which attaches the barrier layer and the first support part to each other; and
a second adhesion part which attaches the barrier layer and the second support part to each other, wherein the second adhesion part is spaced apart from the first adhesion part,
wherein an interval between the first adhesion part and the second adhesion part is greater than an interval between the first support part and the second support part.

16. A display device, comprising:
a display panel which includes a first non-folding region, a second non-folding region, and a folding region between the first non-folding region and the second non-folding region; and
a lower member below the display panel,
wherein the lower member includes:
a support layer below the display panel;
a digitizer below the support layer, wherein the support layer is disposed between the display panel and the digitizer;
a lower adhesion layer in contact with a bottom surface of the support layer and with a top surface of the digitizer; and
a cover layer in contact with the bottom surface of the support layer, wherein the cover layer does not overlap the lower adhesion layer when viewed in a plan view.

17. The display device of claim 16, wherein the digitizer includes:
a base layer; and
a plurality of coils on one surface of the base layer,
wherein the lower adhesion layer covers an undulation on the top surface of the digitizer, wherein the undulation is defined by the plurality of coils.

18. An electronic device, comprising:
a display device which includes a signal transmission region through which an optical signal passes, a display region adjacent to the signal transmission region, and a non-display region adjacent to the display region, wherein the signal transmission region includes an element area which a light-emitting element overlaps and a transmission area which the light-emitting element does not overlap; and
an electronic module below the display device, wherein the electronic module overlaps the signal transmission region,
wherein the display device includes:
a display panel which includes a first non-folding region, a second non-folding region, and a folding region between the first non-folding region and the second non-folding region; and
a lower member below the display panel,
wherein the lower member includes:
a support layer below the display panel, the support layer including a first support part which overlaps the first non-folding region, a second support part which overlaps the second non-folding region, and a folding part which overlaps the folding region, wherein a plurality of openings is defined in the folding part;
a digitizer below the support layer, wherein the digitizer corresponds to the first support part and the second support part, and the support layer is disposed between the display panel and the digitizer;
a cover layer between the support layer and the digitizer, wherein the cover layer is attached below the folding part; and
a lower adhesion layer between the support layer and the digitizer, wherein the lower adhesion layer is below the first support part and the second support part.

19. The electronic device of claim 18,
wherein the display device further includes a window,
wherein the window includes a base film and a bezel pattern which overlaps the non-display region.

20. The electronic device of claim 18, wherein the electronic module includes a camera module.

* * * * *